United States Patent
Darapu et al.

(10) Patent No.: US 10,594,386 B2
(45) Date of Patent: Mar. 17, 2020

(54) DETERMINING AN ATTENUATION ENVIRONMENT OF A SATELLITE COMMUNICATION TERMINAL

(71) Applicant: Viasat, Inc., Carlsbad, CA (US)

(72) Inventors: Ramanamurthy V. Darapu, Gilbert, AZ (US); Ian A. Cleary, Tempe, AZ (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 16/433,711

(22) Filed: Jun. 6, 2019

(65) Prior Publication Data

US 2019/0349072 A1 Nov. 14, 2019

Related U.S. Application Data

(63) Continuation of application No. 15/004,675, filed on Jan. 22, 2016, now Pat. No. 10,361,771.

(51) Int. Cl.
*H04B 7/185* (2006.01)
*G01S 19/22* (2010.01)
(Continued)

(52) U.S. Cl.
CPC .......... *H04B 7/18513* (2013.01); *G01S 19/22* (2013.01); *G01S 19/28* (2013.01);
(Continued)

(58) Field of Classification Search
CPC ......... H04W 4/02; H04W 4/029; H04W 8/20; H04W 4/025; H04W 76/10; H04W 64/00;
(Continued)

(56) References Cited

U.S. PATENT DOCUMENTS 5,946,603 A 8/1999 Ibanez-Meier
5,983,071 A 11/1999 Gagnon et al.
(Continued)

OTHER PUBLICATIONS

Automatic Satellite Systems, www.accessantennas.com.au, Aug 3, 2015, Australia, 4 pgs.
(Continued)

*Primary Examiner* — Olumide Ajibade Akonai
(74) *Attorney, Agent, or Firm* — Holland & Hart LLP

(57) ABSTRACT

Described techniques and apparatuses relate to determining an attenuation environment surrounding a satellite terminal in a satellite communication system. The satellite terminal may receive signals from an auxiliary satellite system, and determine aspects of an attenuation environment that may affect communications with a communications satellite system. For example, transmissions from an auxiliary satellite system may be associated with a respective location of the transmitting satellite in order to define an attenuation profile for the satellite terminal antenna assembly. Subsequent signals from the auxiliary satellite system may be compared with the attenuation map, and the comparison may be used to identify a diagnostic condition for communications with a communications satellite system. In some examples the comparison of signals to the attenuation profile may indicate an obstruction between the satellite terminal antennas and a communications satellite, or a misalignment of a satellite terminal antenna assembly.

20 Claims, 11 Drawing Sheets

(51) Int. Cl.
*G01S 19/28* (2010.01)
*H04B 17/318* (2015.01)
*G01S 19/48* (2010.01)
*G01S 19/21* (2010.01)
*H04W 4/02* (2018.01)
*H04W 8/20* (2009.01)
*H04W 4/029* (2018.01)

(52) U.S. Cl.
CPC ............ *G01S 19/21* (2013.01); *G01S 19/48* (2013.01); *H04B 17/318* (2015.01); *H04W 4/02* (2013.01); *H04W 4/029* (2018.02); *H04W 8/20* (2013.01)

(58) Field of Classification Search
CPC ... H04W 36/08; H04W 64/003; H04W 84/06; H04L 67/12; H04B 17/318; H04B 1/10; H04B 7/18513; H04B 17/26; H04B 1/7113; H04B 2201/709718; G01S 5/0252; G01S 19/22; G01S 19/28; G01S 5/0215; G01S 19/45
See application file for complete search history.

(56) References Cited

U.S. PATENT DOCUMENTS

| | | | |
|---|---|---|---|
| 6,009,116 A | 12/1999 | Bednarek et al. | |
| 6,070,051 A | 5/2000 | Astrom et al. | |
| 6,169,881 B1* | 1/2001 | Astrom | H04B 7/18519 455/12.1 |
| 6,252,547 B1 | 6/2001 | Perry et al. | |
| 6,272,316 B1 | 8/2001 | Wiedeman et al. | |
| 6,421,528 B1 | 7/2002 | Rosen et al. | |
| 6,587,687 B1 | 7/2003 | Wiedeman | |
| 6,678,520 B1 | 1/2004 | Wang | |
| 7,592,953 B2 | 9/2009 | Morana | |
| 7,667,643 B2 | 2/2010 | Handermann et al. | |
| 7,784,070 B2 | 8/2010 | Chang et al. | |
| 8,606,433 B2 | 12/2013 | Taylor | |
| 8,789,116 B2 | 7/2014 | Miller et al. | |
| 8,995,415 B2 | 3/2015 | Yang et al. | |
| 9,679,406 B2 | 6/2017 | Robinson et al. | |
| 2002/0044614 A1* | 4/2002 | Molnar | H04B 1/0003 375/346 |
| 2003/0181162 A1 | 9/2003 | Matula | |
| 2008/0158078 A1 | 7/2008 | Allen et al. | |
| 2008/0242305 A1 | 10/2008 | Kahlert et al. | |
| 2012/0322497 A1 | 12/2012 | Navda et al. | |
| 2014/0225767 A1 | 8/2014 | Cordone | |
| 2014/0266873 A1 | 9/2014 | Pighin et al. | |
| 2014/0331272 A1 | 11/2014 | Gupta et al. | |
| 2016/0238711 A1 | 8/2016 | Matthews | |
| 2017/0134059 A1* | 5/2017 | Eskridge, Jr. | H04B 7/18506 |

OTHER PUBLICATIONS

Compact, Lightweight TV at sea, www.intelliantech.com/Sattv/i-Series/i2, Aug. 3, 2015, 5 pgs.

Satellite TV Antenna Systems, www.raymarine.com/, Aug. 3, 2015, 16 pgs.

Star Choice Dish High Definition Dish Size, www.usedottawa.com, 2 pgs.

TracVision TV6 Marine Satellite Television System, www.kvh.com/Leisure/Marine-Systems/Television/TV-series/TracVision-TV6.aspx, 2 pgs.

Your R.V. and Mobile Satellite Specialists, www.antennawizard.co/bell.html,1 pg.

* cited by examiner

Aggregated Position Diagram

RF Signal Characteristic Mapping

Attenuation Profile

US 10,594,386 B2

DETERMINING AN ATTENUATION ENVIRONMENT OF A SATELLITE COMMUNICATION TERMINAL

CROSS REFERENCE

The present application for patent is a Continuation of U.S. patent application Ser. No. 15/004,675 by Darapu, et al., entitled "DETERMINING AN ATTENUATION ENVIRONMENT OF A SATELLITE COMMUNICATION TERMINAL," filed Jan. 22, 2016, the entirety of each of which being incorporated herein by reference for any and all purposes.

BACKGROUND

For a proper installation of an antenna, it is often necessary to ensure a clear line-of-sight (LOS), or an otherwise low attenuation environment between the antenna and a target device, such as a satellite. Although an attenuation environment for an antenna may not change significantly after installation, certain changes after installation can impair performance of the communication link provided between the antenna and the target. For instance, an obstruction may block or impeded the path between the antenna and the target, or the antenna may become misaligned with respect to the target.

When a communication link between an antenna and a target becomes degraded, or fails entirely, it may not be apparent when such conditions are related to a change in an attenuation environment. For example, a communications link may also become degraded as a result of a hardware failure, a software failure, or a logical communications link failure. To determine the cause of degraded performance, a technician may need to visit the site location of the antenna, which may increase operational costs.

SUMMARY

The described features generally relate to determining an attenuation environment for a satellite terminal in a satellite communication system. In some examples the satellite terminal may receive signals from a first satellite (or group of satellites), and determine aspects of an attenuation environment related to communications between the satellite terminal and a second satellite based on measured characteristics of the received signals. For example, various characteristics of transmissions from a first satellite (or group of satellites) may be associated with a respective location of the transmitting satellite in order to define an attenuation profile (e.g., an attenuation map) for the satellite terminal. Subsequent signals from the first satellite (or group of satellites) may be compared with the attenuation map, and the comparison may be used to identify a diagnostic condition for communications with a second satellite. Signals received from the first satellite (or group of satellites) may be compared to an attenuation map to indicate, for example, directions of various obstructions with respect to a field of view of the satellite terminal antennas, and/or indicate a change in orientation of a satellite terminal antenna assembly.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure.

Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
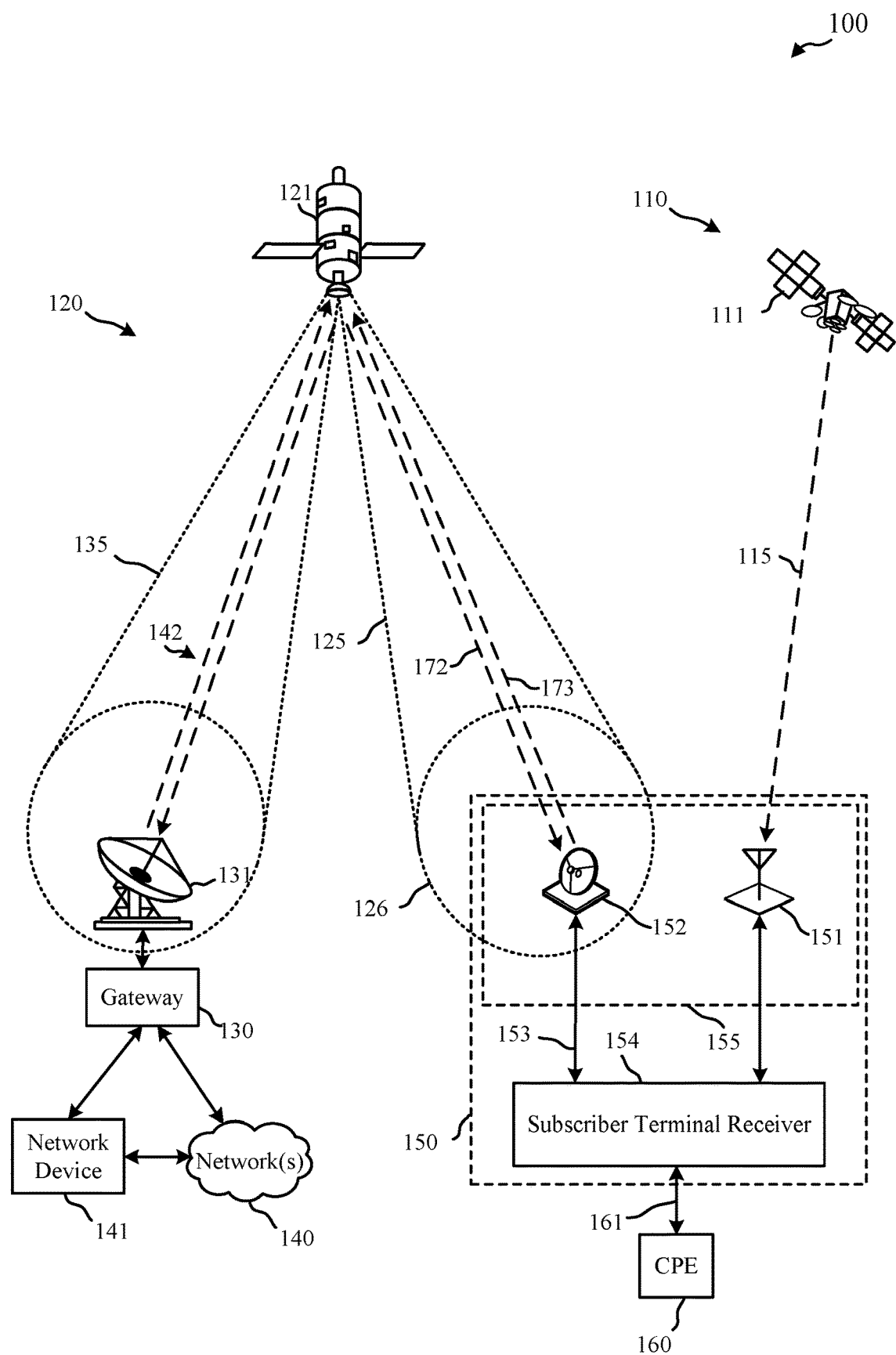
FIG. 1 shows a diagram of a satellite communication environment in accordance with aspects of the present disclosure.

A satellite terminal may employ a communications antenna to establish a primary communications link between a communications satellite system and the satellite terminal. The primary communications link may be configured for bi-directional communications (e.g., transmitting and receiving, etc.), or uni-directional communications (e.g., receiving), in some cases. The satellite terminal may also be configured with an auxiliary antenna, such as a global navigation satellite system (GNSS) antenna, configured to receive signals from a GNSS satellite constellation (e.g., Global Positioning System (GPS), Globalnaya Navigazionnaya Sputnikovaya Sistema (GLONASS), etc.). The auxiliary antenna may be located in the proximity of the satellite terminal, and in some examples the antennas may be co-located within a satellite terminal antenna assembly.

According to aspects of the present disclosure, characteristics of signals transmitted from an auxiliary satellite system and received by an auxiliary antenna at the satellite terminal may be used to indicate a diagnostic condition (e.g., obstruction, misalignment, etc.) associated with communications between the satellite terminal and the communications satellite. For example, a detected loss of GNSS signals in an area of a field of view corresponding to a location of the communications satellite may indicate that an obstruction is blocking communications between the satellite terminal and the communications satellite. This indication of a possible obstruction may benefit the troubleshooting and/or preventative maintenance of various aspects of the satellite communications. For example, an indication suggesting an obstruction may be used to notify the subscriber of the obstruction so that the obstruction can be cleared without sending a service technician. Alternatively, the indication may be used to trigger sending a service technician to either move the satellite terminal antenna assembly, or clear the obstruction. In other examples, a diagnostic condition may be associated with a misalignment of the satellite terminal antenna assembly, and an indication of the misalignment may be used to determine that a service technician needs to be sent to realign the antenna assembly.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communication environment 100 in accordance with aspects of the present disclosure. The satellite communication environment 100 includes a communications satellite system 120, an auxiliary satellite system 110, and a satellite terminal 150.

The communications satellite system 120 may include one or more communications satellites 121 and one or more gateways 130. The one or more communications satellites 121 in the communications satellite system 120 may include any suitable type of communication satellite configured for wireless communication with the gateway 130 and one or more satellite terminals 150. In some examples, some or all of the communications satellites 121 may be in geostationary orbits, such that their locations with respect to terrestrial devices may be relatively fixed, or fixed within an operational tolerance or other orbital window. In other examples, any appropriate orbit (e.g., low Earth orbit (LEO), medium Earth orbit (MEO), etc.) for one or more satellite(s) 121 of the communications satellite system 120 may be used.

The satellite terminal 150 may include a satellite terminal communications antenna 152 configured for receiving forward link signals 172 from a communications satellite 121. The satellite terminal communications antenna 152 may also be configured to transmit return link signals 173 to a communications satellite 121. Thus, the satellite terminal 150 may be configured for uni-directional or bi-directional communications with one or more communications satellites 121 the communications satellite system 120. In some examples, the satellite terminal communications antenna 152 may be directional. For example, the satellite terminal communications antenna 152 may have a peak gain along a primary axis (e.g., an antenna boresight) which rolls off relatively steeply in off-axis directions. A steep roll-off in antenna gain may be referred to as a narrow field of view of an antenna. In some examples the satellite terminal communications antenna 152 may be configured with a narrow field of view by way of a fixed configuration of focusing and/or reflecting elements such as an antenna having a parabolic dish reflector. In some examples the satellite terminal communications antenna 152 may be configured with a narrow field of view by way of beamforming, where the field of view may be electronically configurable at an array of antenna elements to aim signal transmission and/or reception along a desired direction.

The communications satellite 121 may communicate via a service beam 125 directed towards a beam coverage area 126 that includes the satellite terminal 150. The beam coverage area 126 may cover any suitable service area (e.g., circular, elliptical, hexagonal, local, regional, national, etc.) and provide service to any number of satellite terminals 150 located in the beam coverage area 126. In some examples the communications satellite 121 may be a multi-beam satellite and may have other service beams 125 covering other beam coverage areas 126, which may or may not overlap with adjacent beam coverage areas 126.

The communications satellite 121 may transmit a forward link signal 172 via the service beam 125 to be received by the satellite terminal 150. The satellite terminal 150 may receive the forward link signal 172 using a satellite terminal communications antenna 152. To establish a suitable communications link for forward link signals 172 between the satellite terminal 150 and the communications satellite, the forward link signal 172 may be received at the satellite terminal 150 with a signal strength or signal-to-noise ratio (SNR) above a threshold, which may depend on the alignment and location of the satellite terminal communications antenna 152, and the attenuation environment around the satellite terminal communications antenna 152 (e.g., the attenuation environment between the satellite terminal 150 and the communications satellite 121). The communications satellite system 120 may communicate with the gateway 130 by sending and/or receiving signals 142 through one or more gateway beams 135. Gateway beams 135 may, for example, carry communications traffic for one or more satellite terminals 150 (e.g., relayed by the communications satellite 121), or other communications between the communications satellite 121 and the gateway 130.

The communications satellite system 120 may operate in one or more frequency bands. For example, the communications satellite system 120 may operate in the International Telecommunications Union (ITU) Ku, K, or Ka-bands, C-band, X-band, S-band, L-band, and the like. Additionally, the satellite terminal communications antenna 152 may be used in other applications besides ground-based stationary systems, including mobile applications such as boats, aircraft, ground-based vehicles, and the like.

The satellite terminal communications antenna 152 may transmit a return link signal 173 to the communications satellite 121. To establish a suitable communications link for return link signals 173 between the satellite terminal 150 and the communications satellite, the return link signals 173 may be received at the communications satellite 121 with a signal strength or SNR above a threshold, which may again depend on the alignment and location of the satellite terminal communications antenna 152 and the attenuation environment around the satellite terminal communications antenna 152 (e.g., the attenuation environment between the satellite terminal 150 and the communications satellite 121). For example, the satellite terminal communications antenna 152 may be considered to be properly aligned with a target (e.g., communications satellite 121) when a transmitted signal of the satellite terminal communications antenna 152 has sufficient antenna gain in the direction of the target to permit signal communication having desired performance characteristics.

The gateway 130 may send and receive signals 142 to and from the communications satellite system 120 using the gateway antenna system 131. The gateway antenna system 131 may be two-way capable and designed with adequate transmit power and receive sensitivity to communicate reliably with at least one communications satellite 121 from the communications satellite system 120. The gateway 130 may also communicate with one or more networks 140. The networks 140 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like. A network device 141 may be coupled with the gateway 130 and may control aspects of the communications satellite system 120. In various examples a network device 141 may be collocated or otherwise nearby the gateway 130, or may be a remote installation that communicates with the gateway 130 and/or network(s) 140 via wired and/or wireless communications link(s).

The satellite terminal communications antenna 152 may be part of a satellite terminal antenna assembly 155, which may also include various hardware for mounting the satellite terminal antennas. A satellite terminal antenna assembly 155 may also include circuits and/or processors for converting (e.g., frequency conversion, modulation/demodulation, multiplexing/demultiplexing, filtering, forwarding, etc.) between radio frequency (RF) satellite communication signals (e.g., forward link signals 172 and/or return link signals 173), and satellite terminal communications signals 153 transmitted between the satellite terminal communications antenna 152 and a satellite terminal receiver 154. Such circuits and/or processors may be included in an antenna communication assembly, which may be referred to as a transmit and receive integrated assembly (TRIA). Additionally or alternatively, the satellite terminal receiver 154 may include circuits and/or processors for performing various radio frequency (RF) signal operations (e.g., receiving, frequency conversion, modulation/demodulation, multiplexing/demultiplexing, etc.). The satellite terminal antenna assembly 155 may also be known as a satellite outdoor unit (ODU), and the satellite terminal receiver 154 may be known as a satellite indoor unit (IDU).

The satellite terminal 150 may be connected via a wired or wireless connection(s) 161 to one or more consumer premises equipment (CPE) 160 and may provide network access service (e.g., Internet access, etc.) or other communication services (e.g., broadcast media, etc.) to CPEs 160 via the communications satellite system 120. The CPE(s) 160 may include user devices such as, but not limited to, mobile phones, personal digital assistants (PDAs), other handheld devices, netbooks, notebook computers, tablet computers, laptops, display devices (e.g., TVs, computer monitors, etc.), printers, and the like. The CPE(s) 160 may also include any equipment located at a premises of a subscriber, including routers, firewalls, switches, private branch exchanges (PBXs), Voice over Internet Protocol (VoIP) gateways, and the like. In some examples, the satellite terminal 150 provides for two-way communications between the CPE 160 and network(s) 140 via the communications satellite system 120 and the gateway 130.

The satellite terminal 150 may also include a satellite terminal auxiliary antenna 151. Although the satellite terminal auxiliary antenna 151 may be a separately installed component, the satellite terminal auxiliary antenna 151 may be co-located with the satellite terminal communications antenna in the satellite terminal antenna assembly 155, in some cases. In this manner, the satellite terminal auxiliary antenna 151 may have a known position and/or orientation relative to the satellite terminal communications antenna 152. In various examples, the satellite terminal auxiliary antenna 151 may include or be coupled with circuits and/or processors for receiving, converting, and/or decoding signals 115 received by the satellite terminal auxiliary antenna 151 from one or more auxiliary satellites 111 of auxiliary satellite system 110.

The satellite terminal auxiliary antenna 151 may be an omnidirectional antenna, or have an otherwise relatively wide field of view configured to receive signals 115 from various auxiliary satellites 111 that may be located in a relatively broad range of positions in the overhead sky, such as from LEO or MEO satellites that traverse across the sky relative to a stationary object on the surface of the earth. While the satellite terminal auxiliary antenna 151 may be capable of receiving signals 115 from a range of directions (e.g., omnidirectional antenna, etc.), the satellite terminal auxiliary antenna 151 may have a signal gain that varies depending on its orientation. In some examples, the satellite terminal auxiliary antenna 151 may be an antenna configured to receive signals from a global navigation satellite system (GNSS) (e.g., GPS, GLONASS, etc.) for location purposes. In such examples, the satellite terminal 150 or a connected device (e.g., a CPE 160) may be able to determine an installation location of the satellite terminal 150 and/or an associated satellite terminal antenna assembly 155 based on information in received signals 115.

The auxiliary satellite system 110 can include one or more satellites, such as auxiliary satellite 111, configured to transmit signals 115 that can be received by various terrestrial devices (e.g., a land-based devices, water-based devices, airborne devices, or any combination thereof, which are located at a lower elevation/altitude than an auxiliary satellite 111). The auxiliary satellites 111 may be in low-earth orbit or medium-earth orbit, such that they circumnavigate the earth in an orbital pattern. Thus, from the perspective of a terrestrial device, an auxiliary satellite 111 may traverse a path across the sky above the terrestrial device.

Auxiliary satellites 111 may be configured to transmit signals 115 in a manner that they may be received by terrestrial devices, and subsequently associated with respective positions of the auxiliary satellite 111 at the time when the signals 115 are transmitted. For example, some signals 115 from the auxiliary satellite system 110 may include ephemeris data for the transmitting auxiliary satellite 111. In other examples, the signal 115 may have a timestamp or other suitable marker that can be used to look up or otherwise determine or calculate ephemeris data for the auxiliary satellite 111 at the time the signal 115 was transmitted. In some examples, a receiving device may determine a time that a signal 115 was received, and associate the time with ephemeris data from a lookup table or other determined or calculated means. In some examples, the association between signals 115 and the position of one or more transmitting auxiliary satellites 111 can be used by receiving devices for determining the position of the receiving device, such as signals 115 and auxiliary satellites 111 associated with a GNSS constellation (e.g., a GPS or GLONASS satellite system).

Although examples of a satellite terminal communications antenna 152 described herein use a two-way satellite communication system for illustrative purposes, the techniques described herein are not limited to such satellite communication embodiments. For example, the hardware and techniques could be used on antennas for point-to-point terrestrial links and in some examples may not be limited to two-way communication. In one embodiment, the hardware and techniques may be used for an initial installation in a receive-only implementation, such as broadcast media. The hardware and techniques may also be used for troubleshooting various aspects of a communication link. For example, various portions of the described data may be stored locally at a satellite terminal 150 and on-site maintenance by a service technician (e.g., a truck roll) may only be performed after a customer indicates a poor signal and remote analysis of the stored data indicates certain diagnostic conditions.

According to aspects of the present disclosure, various devices of the satellite communication environment may store an attenuation profile corresponding to signals 115 from an auxiliary satellite system 110 as received by a satellite terminal auxiliary antenna 151 at the satellite terminal 150. The attenuation profile can be used to map an RF signal characteristic associated with an auxiliary satellite 111 from the auxiliary satellite system 110, such as RF signal strength, RF signal attenuation, RF signal interference, RF signal-to-noise ratio, RF signal-to-interference-plus-noise ratio, and the like. In various examples, the attenuation profile may be determined based on predetermined characteristics (e.g., transmission power and/or beam width, antenna gain profiles, antenna orientation, known satellite orbital positions, satellite terminal position, etc.) and/or measured characteristics from signals 115 received from an auxiliary satellite 111. In various subsequent operations a signal 115 transmitted by an auxiliary satellite 111 from the auxiliary satellite system 110 can be received at the satellite terminal 150 and compared to the stored attenuation profile. The comparison may be used to identify a diagnostic condition for communications between the satellite terminal 150 and a communications satellite 121 from the communications satellite system 120.

For instance, a signal 115 received from an auxiliary satellite 111 of the auxiliary satellite system 110 may be weaker than expected, or not received at all, while the auxiliary satellite 111 is located in an area corresponding to a portion of a stored attenuation profile associated with relatively high, or at least non-zero signal strength. Such a condition may indicate a blockage between the satellite terminal auxiliary antenna 151 and the auxiliary satellite 111. Depending on the location of the auxiliary satellite 111 during such a detected condition, the blockage may be suggestive of a corresponding blockage between the satellite terminal communications antenna 152 and a communications satellite 121 from a communications satellite system 120. Thus, the detected blockage between the auxiliary satellite 111 and the satellite terminal auxiliary antenna 151 may be used to identify a diagnostic condition of a line-of-sight blockage between the satellite terminal communications antenna 152 and the communications satellite 121. In various examples, similar comparisons may be made to identify a degraded line-of-sight or an impending line-of-sight blockage. In other examples, such as examples when an obstruction is detected in an area that does not correspond to a location of the communications satellite 121, the detected obstruction may indicate that communications with the communications satellite 121 are unlikely to be affected by the obstruction.

In some examples, an attenuation profile may be based in part on a gain profile of the satellite terminal auxiliary antenna 151, where the gain profile may reflect a higher gain along a principal direction of the satellite terminal auxiliary antenna 151. In such examples, the attenuation profile may reflect a combination of a strength of a signal 115 as transmitted by a transmitting auxiliary satellite 111, and an orientation of the satellite terminal auxiliary antenna 151 with respect to the auxiliary satellite 111. In examples where a satellite terminal communications antenna 152 and a satellite terminal auxiliary antenna 151 are coupled in a satellite terminal antenna assembly 155, information about the orientation of the satellite terminal auxiliary antenna 151 may be subsequently used to determine aspects of the orientation of the satellite terminal communications antenna 152. For example, comparisons between attenuation profiles over time may indicate that a satellite terminal antenna assembly 155 has moved, and an identified diagnostic condition may be suggestive of a misalignment between the satellite terminal antenna assembly 155 and a communications satellite 121.

The steps for determining and applying an attenuation profile as described herein may take place in various components of the satellite communication environment 100. For instance, attenuation profiles may be stored at a satellite terminal 150, a CPE 160, a gateway 130, or a network device 141. Signals may be received from the auxiliary satellite system 110 and the communications satellite system 120 and measured at the satellite terminal 150. Measurements may be used in calculations at the satellite terminal 150 or sent to a device on the network (e.g., a CPE 160, a network device 141, etc.). Various comparisons to a stored attenuation profile may be made at the satellite terminal 150, a CPE 160, a gateway 130, or a network device 141.

In various examples, such communications, measurements, comparisons and/or indications may be automatic and ongoing, and/or may be triggered by certain events. In some examples, identifying a diagnostic condition may trigger communication of the diagnostic condition to various devices of the satellite communication environment 100. In some examples, a satellite terminal 150 may be able to communicate with more than one communications satellite 121 from the communications satellite system 120. In such examples, the identification of a diagnostic condition based on signals 115 from an auxiliary satellite 111 may be followed by selecting a different communications satellite 121 for providing communication services, where the selection is based at least in part on the identified diagnostic condition.

Figure 2:
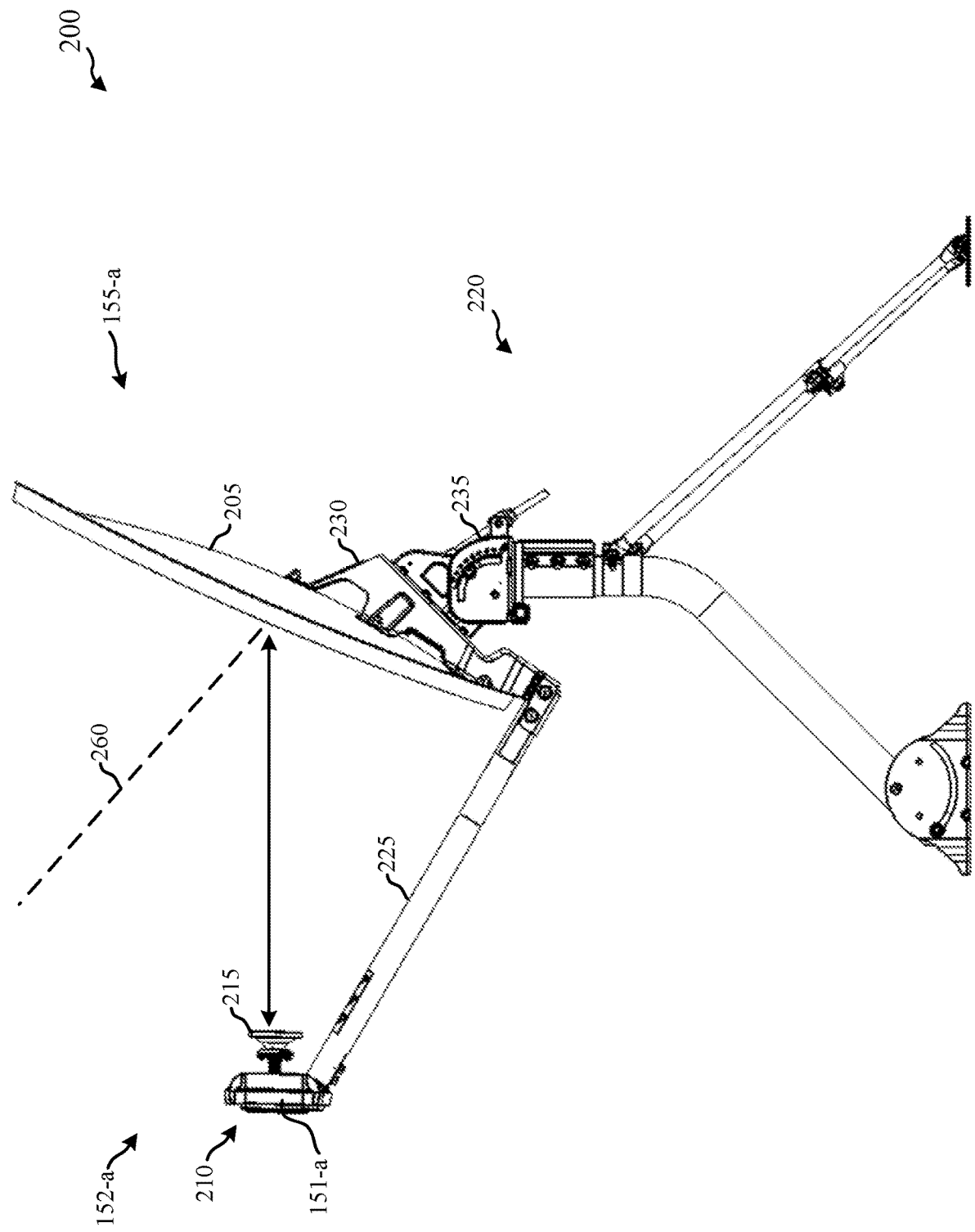
FIG. 2 shows a diagram of an example satellite terminal antenna assembly in accordance with aspects of the disclosure.

FIG. 2 shows a diagram 200 of an example satellite terminal antenna assembly 155-*a* in accordance with aspects of the disclosure. The satellite terminal antenna assembly 155-*a* may be an example of aspects of the satellite terminal antenna assembly 155 of the satellite terminal 150 described with reference to FIG. 1. The satellite terminal antenna assembly 155-*a* includes a satellite terminal communications antenna 152-*a*, a satellite terminal auxiliary antenna 151-*a*, an antenna communication assembly 210, and a mounting structure 220.

The satellite terminal antenna assembly 155-*a* includes a reflector 205 mounted to the mounting structure 220 via a mounting bracket assembly 235. An antenna communication assembly 210 is attached to the reflector 205 via an arm 225 and a skew plate 230. The antenna communication assembly 210 may include circuits and/or processors to process RF signals transmitted by and/or received at the satellite terminal antenna assembly 155-*a*. In some examples, the antenna communication assembly 210 (e.g., TRIA) may be coupled with a satellite IDU (e.g., a satellite terminal receiver 154 as described with reference to FIG. 1) for a satellite terminal via an electrical feed (not shown).

The antenna communication assembly 210 includes a feed horn 215 and a transceiver associated with communication signals transmitted between the satellite terminal communications antenna 152-*a* and a communication satellite (e.g., a communications satellite 121 of the communications satellite system 120). The antenna communication assembly 210 may include various circuits and/or processors to support satellite communications, where such components may be assembled into a housing with the feed horn 215 opening towards the reflector 205. Electromagnetic signals from a communications satellite 121, such as forward link signals 172 and/or return link signals 173 described with reference to FIG. 1, may be transmitted by and received at the antenna communication assembly 210 via downlink and uplink beams.

A satellite terminal communications antenna boresight 260 may generally illustrate a principal axis (e.g., direction of maximum gain, etc.) of the satellite terminal antenna assembly 155-*a*, which during installation, may be aligned along a direction between the satellite terminal antenna assembly 155-*a* and a communications satellite 121. By aligning the satellite terminal communications antenna boresight 260 in this manner, the satellite terminal communications antenna 152-*a* may have an optimal gain and/or sensitivity with respect to communications with the communications satellite 121.

The mounting bracket assembly 235 may be of a conventional design and can include azimuth, elevation, and skew adjustments of the reflector 205 relative to the mounting structure 220. Elevation refers to the angle between the satellite terminal antenna assembly 155-*a* and the horizon, which may be measured with reference to the satellite terminal communications antenna boresight 260. Azimuth refers to the angle between the satellite terminal communications antenna boresight 260 and a direction of true north in a horizontal plane. Skew refers to the angle of rotation about the satellite terminal communications antenna boresight 260.

The satellite terminal antenna assembly 155-*a* may, for example, be initially pointed by the installer such that the satellite terminal communications antenna boresight 260 is pointed in the general direction of a communications satellite 121. The initial azimuth, elevation, and skew angles for pointing the satellite terminal antenna assembly 155-*a* may be determined by the installer based on the known location of the satellite and the known geographic location where the satellite terminal antenna assembly 155-*a* is being installed. Once the satellite terminal antenna assembly 155-*a* is coarsely positioned and/or oriented in the general direction of the communications satellite 121, the elevation and/or azimuth angles can be further adjusted by the installer to fine tune the pointing until the satellite terminal communications antenna boresight 260 is sufficiently pointed at the communications satellite 121. A measurement device, such as a power meter, may be used to directly measure the signal strength of the received forward link signal 172. Additionally or alternatively, a measurement device may be used to measure some other metric indicating the signal strength of the received forward link signal 172. The measurement device may for example be an external device that the installer temporarily attaches to the electrical feed. As another example, the measurement device may be integrated into the transceiver (e.g., integrated into the antenna communication assembly 210), or some other portion of a satellite terminal 150. In such a case, the measurement device may for example produce audible tones indicating signal strength to assist the installer in pointing the satellite terminal antenna assembly 155-*a*.

The installer may iteratively adjust the elevation and/or azimuth angle of the satellite terminal antenna assembly 155-*a* until the received signal strength, as measured by the measurement device, reaches a predetermined value. In some examples, the installer adjusts the position and/or orientation of the satellite terminal antenna assembly 155-*a* until the received signal strength and/or SNR of the transmitted signals at the target are maximized. In other words, the installer attempts to position the satellite terminal antenna assembly 155-*a* such that the satellite terminal communications antenna boresight 260 is pointed directly at the communications satellite 121. Once the satellite terminal antenna assembly 155-*a* is sufficiently aligned, the installer can immobilize the mounting bracket assembly 235 to preclude further movement of the satellite terminal antenna assembly 155-*a*.

In examples other than the example of FIG. 2, a satellite terminal antenna assembly 155 may have a different mounting structure than that shown, such as, for example, a mounting structure suitable to mount on a pole. In examples where a satellite terminal antenna assembly 155 is mounted on a moving object (e.g., a vehicle, aircraft, boat, etc.), or the target satellite is moving (e.g., LEO orbit, etc.) the satellite terminal antenna assembly 155 may include one or more mechanical positioning elements (e.g., gimbal, etc.) to reposition the satellite terminal antenna assembly 155 to track a communications satellite 121. These positioning elements may be automatically controlled to reposition the satellite terminal antenna assembly 155 as the object and/or a communications satellite 121 move relative to each other.

The satellite terminal antenna assembly 155-*a* also includes a satellite terminal auxiliary antenna 151-*a*, which may be an example of the satellite terminal auxiliary antenna 151 described with reference to FIG. 1. As illustrated, the components of the satellite terminal auxiliary antenna 151-*a* may be integrated into the antenna communication assembly 210. For example, the satellite terminal auxiliary antenna 151-*a* may be a GNSS receiver (e.g., a GPS receiver or a GLONASS receiver) incorporating antenna elements and associated receiver and/or processing circuits in a circuit assembly that may be co-located or otherwise coupled with other circuits of the antenna communication assembly 210. In various examples the satellite terminal auxiliary antenna 151-a, the antenna communication assembly 210, or some other portion of a satellite terminal 150 may include processing circuits to associate signals received from an auxiliary satellite (e.g., auxiliary satellite 111 of FIG. 1, etc.) with the respective position of the transmitting auxiliary satellite, such as decoding ephemeris data from the received signals. In some examples the satellite terminal auxiliary antenna 151-a, the antenna communication assembly 210, or some other portion of a satellite terminal 150 may include processing circuits for determining a position of the satellite terminal antenna assembly 155-a.

Figure 3:
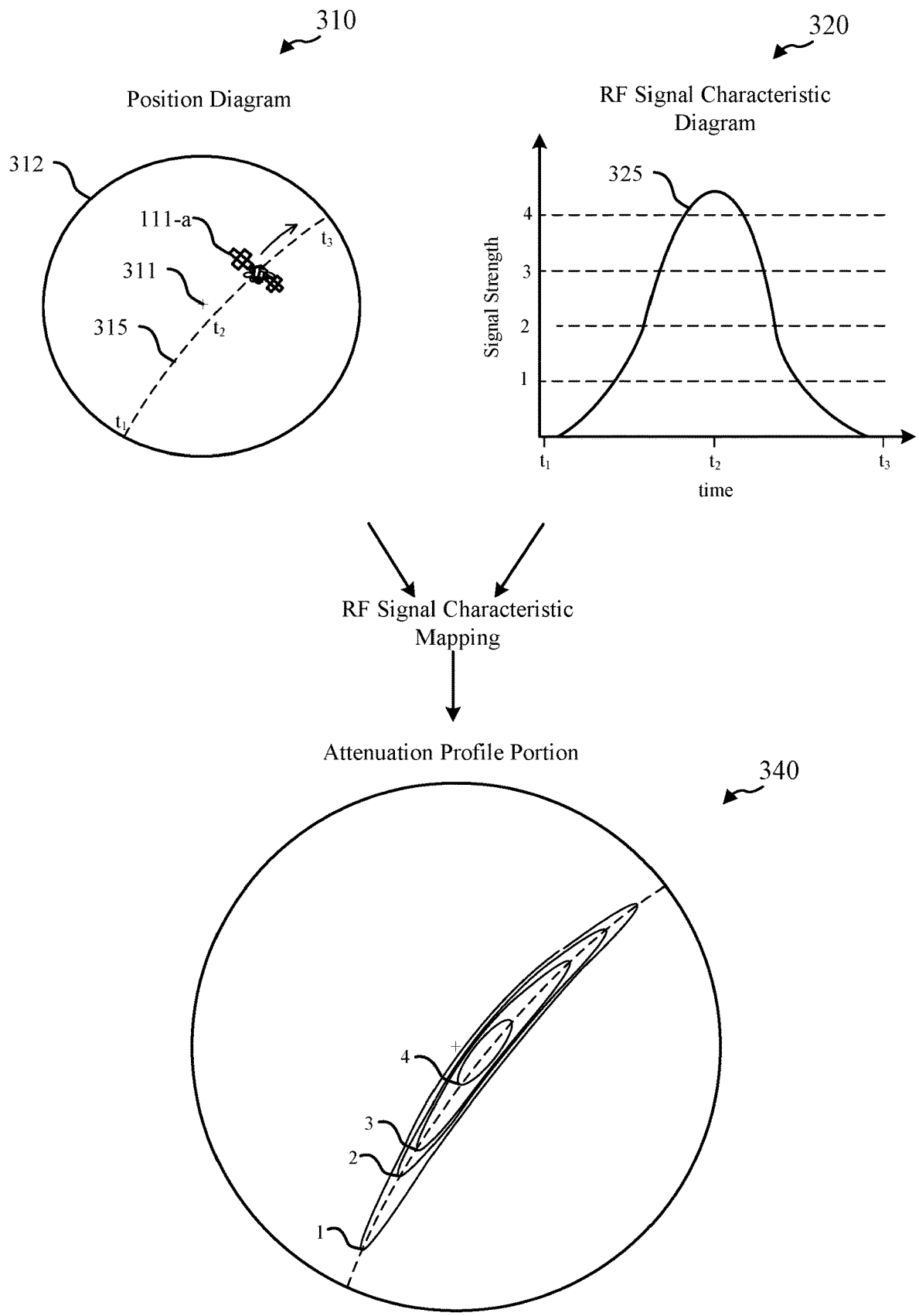
FIG. 3 illustrates a mapping of RF transmissions from a single overhead pass of a satellite with position information of the satellite to form a portion of an attenuation profile, in accordance with aspects of the present disclosure.

FIG. 3 illustrates a mapping of RF transmissions from a single overhead pass of an auxiliary satellite 111-a with position information of the auxiliary satellite 111-a to form a portion of an attenuation profile, in accordance with aspects of the present disclosure. The mapping can include a position diagram 310, an RF signal characteristic diagram 320, and a corresponding attenuation profile portion 340. In the example illustrated by FIG. 3, the associated satellite terminal auxiliary antenna 151 has a clear overhead field of view, lacking any obstructions that would prevent signals from the auxiliary satellite 111-a from reaching the satellite terminal auxiliary antenna 151.

The position diagram 310 maps the position of the auxiliary satellite 111-a along an orbital path 315 between times $t_1$ and $t_3$. In the present example, the position diagram 310 is a polar mapping, where an angle about an origin 311 can represent an azimuth angle, and a radial distance from the origin 311 can represent an elevation angle. The polar mapping may be representative of the perspective of a satellite terminal 150, where the coordinates of the mapping may be determined from a known location of the satellite terminal 150 (e.g., a location determined from signals received by a satellite terminal auxiliary antenna 151, or an otherwise determined location), and one or more known positions of an auxiliary satellite 111 (e.g., ephemeris data for auxiliary satellite 111-a).

In the present example, the polar mapping is bounded at boundary 312 by elevation angles associated with the horizon, which in various examples may be a zero degree (or substantially zero degree) elevation angle, or an angle of 90 degrees (or approximately 90 degrees) from vertical. In other words, the origin 311 of the attenuation profile may represent a vertical orientation with respect to a satellite terminal auxiliary antenna 151, and the boundary 312 of the attenuation profile portion 340 can represent the horizon. In other examples, the boundary 312 of an attenuation profile portion 340 may be different, such as a boundary that has a higher elevation angle than the horizon. In some examples, the attenuation profile may be centered about a non-vertical orientation. For example, an origin 311 of a polar mapping may be located along, or representative of a direction along a non-vertical satellite terminal communications antenna boresight 260. In such examples, the boundary 312 may still represent a horizon from the perspective of the satellite terminal location, but the origin 311 need not be located at the center of the area within the boundary 312. In various examples the boundary 312 may not be circular, and may have boundaries that reflect other conditions or limits.

The RF signal characteristic diagram 320 maps an RF signal characteristic 325 of a signal 115 received from the auxiliary satellite 111-a between times $t_1$ and $t_3$. In various examples the RF signal characteristic 325 may be measured and/or otherwise calculated by components of a satellite terminal 150, such as components of a satellite terminal auxiliary antenna 151, a satellite terminal antenna assembly 155, or a satellite terminal receiver 154. In the present example, the RF signal characteristic diagram 320 plots a signal strength between times $t_1$ and $t_3$. In other examples, an RF signal characteristic diagram 320 can correspond to any other suitable measurement of a signal 115, which may include RF signal attenuation, RF signal interference, RF signal-to-noise ratio, RF signal-to-interference-plus-noise ratio (SINR), or the like. In some examples a signal characteristic may be a binary characteristic, where a positive condition may indicate that a signal has been received at a particular time from an auxiliary satellite 111-a, and a null condition may indicate that a signal has not been received at a particular time from an auxiliary satellite 111-a. In other examples a binary characteristic may indicate times when an RF characteristic of a signal 115 is above or below a threshold (e.g., an SNR threshold, a signal strength threshold, etc.).

In various examples, $t_1$ and $t_3$ may correspond to times where the orbital path 315 of the auxiliary satellite 111-a crosses into or out of the field of view of a satellite terminal auxiliary antenna 151, which in some examples may be times when the auxiliary satellite 111-a passes the horizon with respect to the location of an associated satellite terminal antenna assembly 155. In such examples, signal quality may be low around $t_1$ or $t_3$ due to ground-level scattering, obstructions, atmospheric effects, and/or relatively large distance between the auxiliary satellite 111-a and the satellite terminal antenna assembly 155. As shown in the present example, the signal strength of the signal 115 may increase at an intermediate time, reaching a peak near $t_2$. In various examples the relatively high signal strength of the signal 115 around $t_2$ may be related to low scattering, short distance, etc. Furthermore, in some examples, the high signal strength at the satellite terminal auxiliary antenna may be based at least in part on sensitivity or gain of the satellite terminal auxiliary antenna 151 being highest at an orientation (e.g., relative to the satellite terminal antenna assembly 155) corresponding to the position of the satellite around $t_2$.

The attenuation profile portion 340 may be determined based at least in part on a combination of the position diagram 310 and the RF signal characteristic diagram 320. For example, the attenuation profile portion 340 can map the RF signal characteristic 325 of signals 115 across the field of view of a satellite terminal antenna assembly 155, based on the generally overhead passing of the auxiliary satellite 111-a along orbital path 315. The contour lines of the attenuation profile portion 340 can represent regions of a constant value of an RF signal characteristic (e.g., lines of constant signal strength), such as RF signal characteristic 325 of the RF signal characteristic diagram 320.

As shown in the present example, the attenuation profile portion 340 need not be limited only to locations along the orbital path 315 corresponding to positions associated with received transmissions. For example, spatial filtering may be used between locations associated with various measurements and/or locations which are not associated with measurements. As shown in the present example, the spatial filtering may include interpolation between positions associated with received signals, and positions associated with a zero value (which may be due to no data at those locations, or an otherwise zero value for the particular RF signal characteristic). Various methods of interpolation may be applied, including linear interpolation, polynomial interpolation, exponential interpolation, and the like. The spatial filter may have filter parameters and/or coefficients that are different between directions along the orbital path 315 of the auxiliary satellite 111-*a* and directions perpendicular to the orbital path 315 of the auxiliary satellite 111-*a*.

Figure 4:
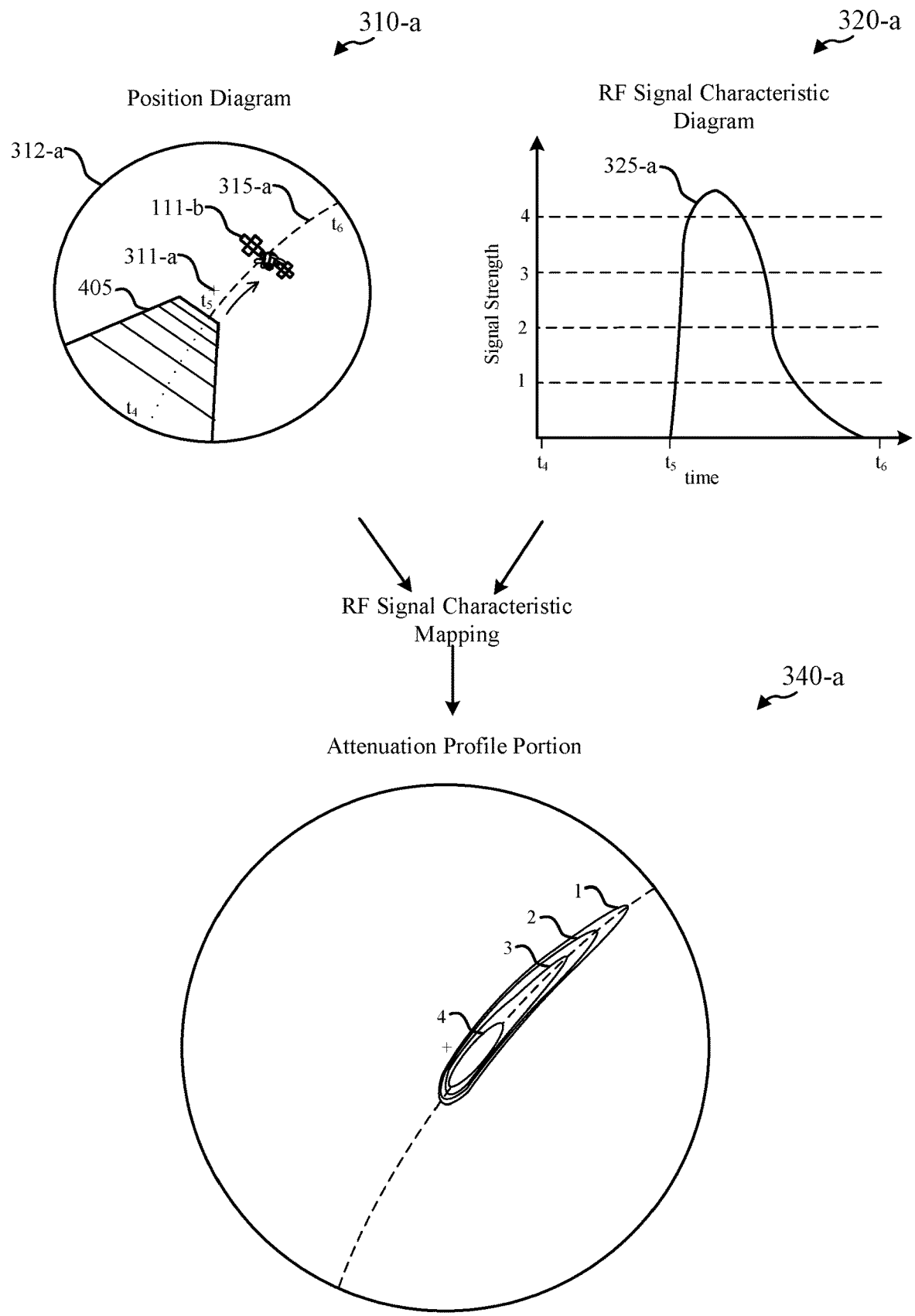
FIG. 4 illustrates a mapping of RF transmissions from a single overhead pass of an satellite with position information of the satellite to form a portion of an attenuation profile, in accordance with aspects of the present disclosure.

FIG. 4 illustrates a mapping of RF transmissions from a single overhead pass of an auxiliary satellite 111-*b* with position information of the auxiliary satellite 111-*b* to form a portion of an attenuation profile, in accordance with aspects of the present disclosure. The mapping can include a position diagram 310-*a*, an RF signal characteristic diagram 320-*a*, and a corresponding attenuation profile portion 340-*c*. In the example illustrated by FIG. 4, the associated satellite terminal auxiliary antenna 151 has an obstructed field of view, preventing signals from the auxiliary satellite 111-*a* from reaching the satellite terminal auxiliary antenna 151 at certain locations of the auxiliary satellite 111-*a*.

The position diagram 310-*a* maps the position of the auxiliary satellite 111-*b* along an orbital path 315-*a* between times between times $t_4$ and $t_6$. The position diagram 310-*a* is again a polar mapping, where an angle about an origin 311-*a* can represent an azimuth angle, and a radial distance from the origin 311-*a* can represent an elevation angle. The polar mapping may be representative of the perspective of a satellite terminal 150, where the coordinates of the mapping may be determined from a known location of the satellite terminal 150 and one or more known positions of an auxiliary satellite 111.

The polar mapping may be bounded at boundary 312-*a* by elevation angles associated with the horizon. In the present example, the environment surrounding a satellite terminal auxiliary antenna 151 (e.g., a satellite terminal antenna assembly 155) includes an obstruction 405, which may represent, for example, a building near a satellite terminal antenna assembly 155. The obstruction 405 may block signals 115 from the auxiliary satellite 111-*b* from reaching the satellite terminal auxiliary antenna 151 between times $t_4$ and $t_5$.

The RF signal characteristic diagram 320-*a* maps an RF signal characteristic 325-*b* of a signal 115 received from the auxiliary satellite 111-*b* between times $t_4$ and $t_6$. In various examples the RF signal characteristic 325 may be measured and/or otherwise calculated by components of a satellite terminal 150, such as components of a satellite terminal auxiliary antenna 151, a satellite terminal antenna assembly 155, a satellite terminal receiver 154. In the present example, the RF signal characteristic diagram 320-*a* plots a signal strength between $t_4$ and $t_6$. In other examples, an RF signal characteristic diagram 320-*a* can correspond to any other suitable 121 measurement of a signal 115, which may include RF signal attenuation, RF signal interference, SNR, SINR, or the like. In some examples the RF signal characteristic 325-*b* may be a binary characteristic, where a positive condition may indicate that a signal has been received at a particular time from the auxiliary satellite 111-*b*, and a null condition may indicate that a signal 115 has not been received at a particular time from the auxiliary satellite 111-*b*. In other examples a binary characteristic may indicate times when an RF characteristic of a signal 115 is above or below a threshold (e.g., a SNR threshold, a signal strength threshold, etc.).

In the present example, the RF signal characteristic 325-*a* may have a value of zero (e.g., zero signal strength) between times $t_4$ and $t_5$, corresponding to the portion of the orbital path 315-*a* where the auxiliary satellite 111-*b* is behind the obstruction 405. The zero value of signal strength may correspond to measurements of zero signal strength for times between $t_4$ and $t_5$ that have already been associated with a portion of the orbital path 315-*a*, or may be times where no data was received (e.g., no signals received from the auxiliary satellite 111-*b* and no known position information of the auxiliary satellite 111-*b*, such as not receiving signals from a GNSS satellite). As shown in the RF signal characteristic diagram 320-*a*, after a period of zero signal strength (e.g., after time $t_5$), the signal strength may climb rapidly as the auxiliary satellite 111-*b* emerges from behind the obstruction 405, and therefore be associated with a steep gradient of the RF signal characteristic 325-*a* with respect to time.

The attenuation profile portion 340-*a* may be determined based at least in part on a combination of the position diagram 310-*a* and the RF signal characteristic diagram 320-*a*. For example, the attenuation profile portion 340-*a* can map the RF signal characteristic 325-*a* of signals 115 across the field of view of the satellite terminal antenna assembly 155, based on the generally overhead passing of the auxiliary satellite 111-*b*. The contour lines of the attenuation profile portion 340-*a* can again represent regions of a constant value of the RF signal characteristic (e.g., lines of constant signal strength of signal 115), such as RF signal characteristic 325-*a* of the RF signal characteristic diagram 320-*a*.

As shown, the attenuation profile portion 340-*a* again need not be limited only to locations along the orbital path 315-*a* corresponding to positions associated with received transmissions. As shown, for example, the determination of the attenuation profile portion 340-*a* can include the application of a spatial filter, and such a filter may have components that are different between directions along the orbital path 315-*a* of the auxiliary satellite 111-*a* and directions perpendicular to the orbital path 315-*a* of the auxiliary satellite 111-*a*. In contrast to the attenuation profile portion 340 described with reference to FIG. 3C, attenuation profile portion 340-*a* shows an effect of the obstruction 405, where the region around the portion of the orbital path 315-*a* between times $t_4$ and $t_5$ remains at an signal strength value of zero. At the location of the attenuation profile portion 340-*a* associated with the location of the auxiliary satellite 111-*b* at time $t_4$, the attenuation profile shows a steep spatial gradient with respect to the RF signal characteristic 325-*a*. Therefore the attenuation profile portion 340-*a* may indicate that a portion of a field of view of a satellite terminal auxiliary antenna 151, and in some examples an associated satellite terminal antenna assembly 155, may have an obstruction that may prevent a communication link in certain portions of a field of view.

Figure 5:
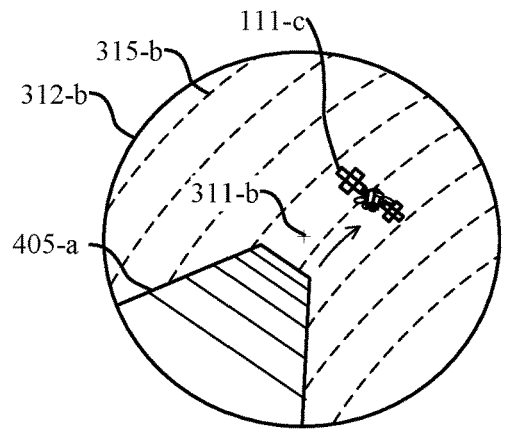
FIG. 5 illustrates a mapping of RF transmissions from multiple overhead passes of one or more satellites to form an attenuation profile, in accordance with aspects of the present disclosure.
Figure 5:
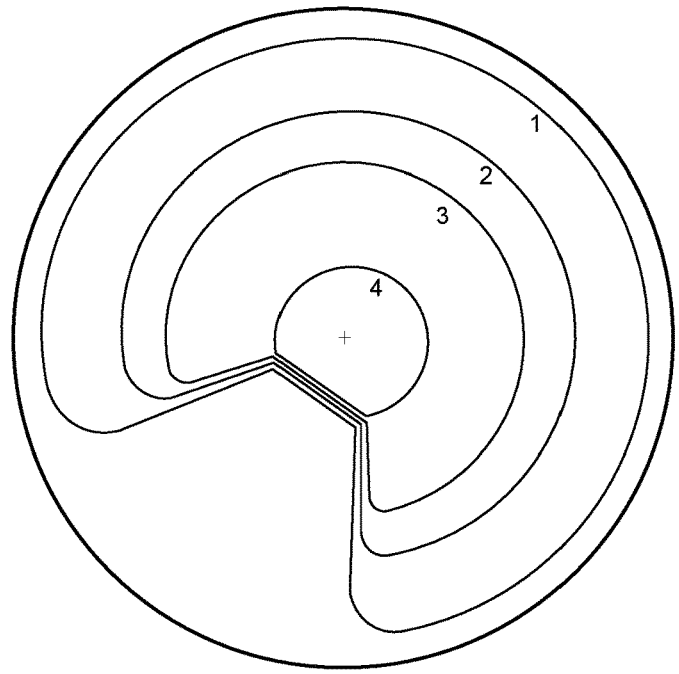

FIG. 5 illustrates a mapping of RF transmissions from multiple overhead passes of one or more auxiliary satellites (e.g., auxiliary satellite(s) 111-*c*) to form an attenuation profile, in accordance with aspects of the present disclosure. The mapping includes an aggregated position diagram 530, and an attenuation profile 550. Although not shown, the mapping may also include one or more RF signal characteristic time histories, similar to RF signal characteristic diagrams 320 described with reference to FIG. 3 or 4.

The aggregated position diagram 530 maps the position of one or more auxiliary satellites 111-*c* along various orbital paths 315-*b*. As shown in the present example, the aggregated position diagram 530 is again a polar mapping, where an angle about an origin 311-*a* can represent an azimuth angle, and a radial distance from the origin 311-*a* can represent an elevation angle. In various examples, the aggregated position diagram 530 can be a collection of discrete position histories (e.g., multiple position diagrams 310 as described with reference to FIGS. 3 and 4), or a single position history over time (e.g., a single continuous position diagram 310 having multiple orbital paths 315-*b* across the field of view). The polar mapping may again be bounded at boundary 312-*b* by elevation angles associated with the horizon. In the present example, the environment surrounding a satellite terminal auxiliary antenna 151 (e.g., a satellite terminal antenna assembly 155) includes an obstruction 405-*a*, which may represent, for example, a building near a satellite terminal antenna assembly 155. The obstruction 405-*a* may block signals 115 from the one or more auxiliary satellites 111-*c* from reaching the satellite terminal antenna assembly 155.

Similarly to the RF signal characteristic mapping described with reference to FIG. 3 or 4, the mapping may also include one or more RF signal characteristic time histories (not shown), such as a signal strength history of a signal 115 from the one or more auxiliary satellites 111-*c*. In the present example, signal strength may have a value of zero at times corresponding to the portion of the orbital paths 315-*b* where the one or more auxiliary satellites 111-*c* are behind the obstruction 405-*a*.

The attenuation profile 550 can be determined based at least in part on the aggregated position diagram 530 and the associated RF signal characteristic time histories (not shown). For example, the attenuation profile 550 can map the RF signal characteristic of signals 115 across the field of view of the satellite terminal antenna assembly 155, based on the generally overhead passing of the one or more auxiliary satellites 111-*c*. The contour lines of the attenuation profile 550 can again represent regions of a constant value of the RF signal characteristic (e.g., lines of constant signal strength of signal 115). As shown, the attenuation profile 550 again need not be limited only to locations along the path(s) 315-*b* corresponding to positions associated with received transmissions. As shown, for example, the determination of the attenuation profile 550 can include the application of a spatial filter, and such a filter may have components that are different between directions along the path(s) 315-*b* of the auxiliary satellite(s) 111-*c* and directions perpendicular to the path(s) 315-*b* of the auxiliary satellite(s) 111-*c*.

As shown in the attenuation profile 550, regions where an obstruction 405-*a* blocks a field of view of a satellite terminal antenna assembly 155 may have a signal strength of zero, and may also be surrounded by an area of high signal strength gradient. Thus, an attenuation profile 550, formed by combining an aggregated position diagram 530 of one or more auxiliary satellites 111-*c* with associated RF signal characteristic histories of signals 115 from the one or more auxiliary satellites 111-*c*, may be used to identify regions of a field of view of a satellite terminal antenna assembly 155 associated with an obstruction 405-*a*. In some examples, a location of the identified obstruction 405-*a* may be associated with a position of a communications satellite (e.g. a position of communications satellite 121 of a communications satellite system 120), and the identification of the obstruction 405-*a* may therefore be used to determine a diagnostic condition associated with communications with the communications satellite.

In various examples, generating an attenuation profile may include a normalization of RF signal characteristics of signals 115 from one or more respective satellites. For example, calculation of an RF characteristic of signals 115 may be normalized with respect to transmission power by dividing the received strength of a signal 115 by a known or otherwise predetermined transmission power of the respective auxiliary satellite 111-*c*. In examples where signals 115 are received from multiple auxiliary satellites 111-*c*, the associated RF signal characteristics may be normalized with respect to each other, including normalization by a scale factor between transmitting auxiliary satellites 111 (e.g., transmission power scale factor, distance scale factor, and the like). Various other normalization techniques may be applied, such as normalizing for distance or orientation between an auxiliary satellite 111-*c* and a satellite terminal antenna assembly 155, normalization for an antenna gain associated with a satellite terminal auxiliary antenna 151, normalization for atmospheric conditions at respective times that signals 115 are transmitted and/or received, and the like. In this manner, signals 115 transmitted via various signal propagation conditions and/or transmissions from multiple auxiliary satellites 111-*c* can be employed to form a single attenuation profile, whether the attenuation profile is as a reference attenuation profile or a subsequently generated attenuation profile used for comparisons.

In some examples the obstruction 405 may be present during the installation of a satellite terminal 150, and may not affect the communications between the satellite terminal 150 and a communications satellite 121 of a communications satellite system. Thus, in some examples of developing an attenuation profile, the obstruction 405 may be employed in a reference attenuation profile that may be used in a later comparison (e.g., defining a reference feature of an attenuation profile). In some examples, an obstruction 405 may have moved, or appeared after the installation of a satellite terminal 150. In such examples, a satellite terminal 150 may have been installed in a manner that established a successful communications link with a communications satellite 121, but subsequently experienced degraded or failed communications with the communications satellite 121 after the obstruction 405 moved or appeared. In some cases, the location of the obstruction 405 may be associated with a position of a communications satellite (e.g. a position of a communications satellite 121 of a communications satellite system 120). Thus, in some examples the appearance or moving of an obstruction 405 in an attenuation profile may be employed to determine a diagnostic condition with respect to communications between a satellite terminal 150 and a communications satellite 121.

Figure 6:
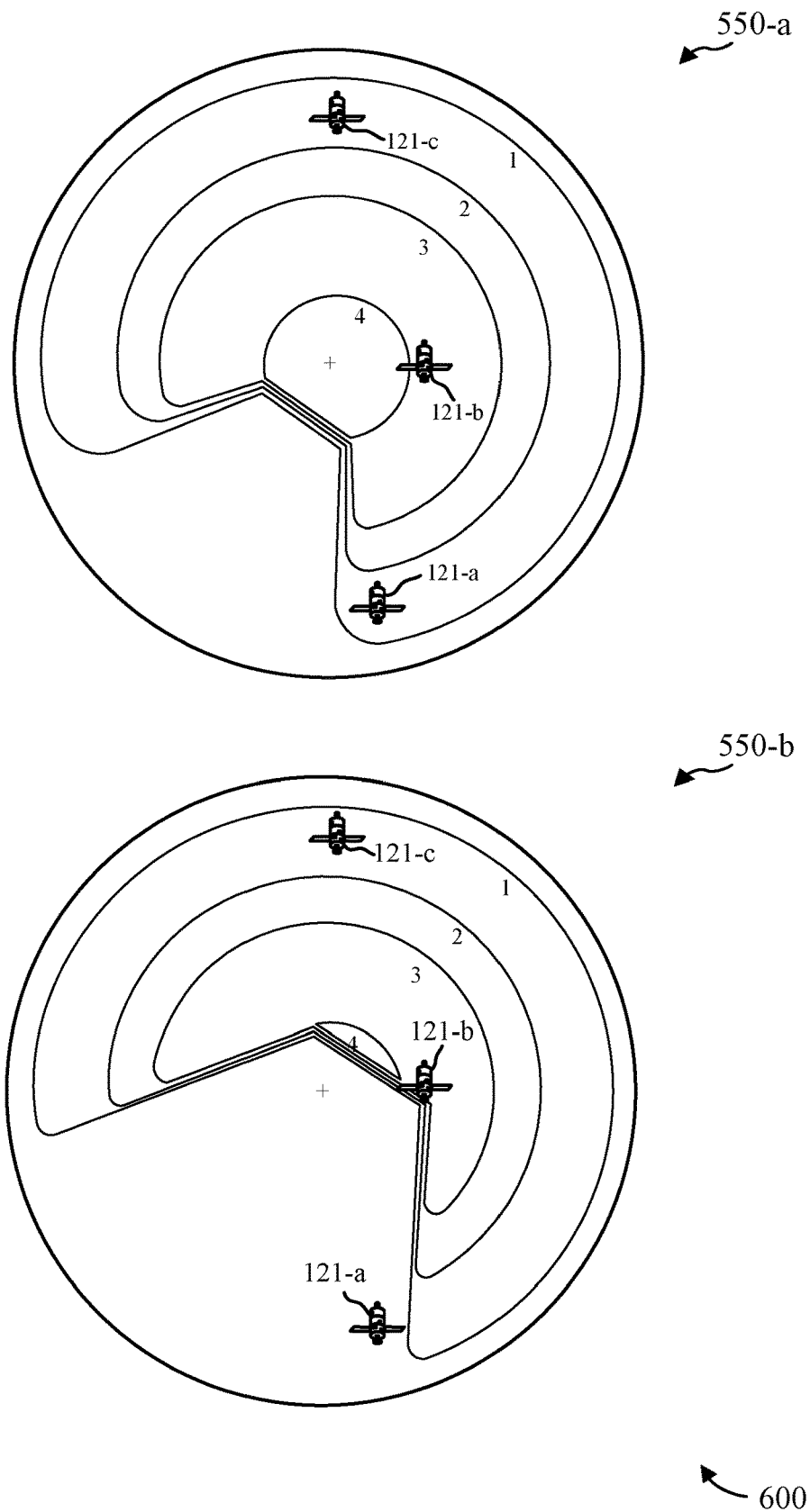
FIG. 6 illustrates a comparison of attenuation profiles that may be employed to suggest a movement of an obstruction, in accordance with aspects of the present disclosure.

FIG. 6 illustrates a comparison 600 of attenuation profiles 550 that may be employed to suggest a movement of an obstruction 405, in accordance with aspects of the present disclosure. As illustrated in the present example, the comparison is made between a first attenuation profile 550-*a* and a second attenuation profile 550-*b*. The attenuation profiles 550-*a* and 550-*b* may be generated from signals 115 of auxiliary satellites 111 in an auxiliary satellite system 110 as described with reference to FIG. 1, 2, 3, 4, or 5. The comparison 600 can made with respect to one or more of a first communications satellite 121-*a*, a second communications satellite 121-*b*, and a third communications satellite 121-*c*, which may each be examples of a communications satellite 121 of a communications satellite system 120 as described with reference to FIG. 1, 2, 3, 4, or 5. For illustrative purposes, each of the first communications satellite 121-*a*, a second communications satellite 121-*b*, and a third communications satellite 121-*c* are shown in their corresponding locations on the attenuation profiles 550-*a* and 550-*b*.

As shown, attenuation profiles 550-*a* and 550-*b* map an RF signal characteristic with respect to a field of view of a satellite terminal auxiliary antenna 151 (e.g., a satellite terminal antenna assembly 155), and may be an example of aspects of attenuation profile 550 described with reference to FIG. 5. Both the first attenuation profile 550-*a* and the second attenuation profile 550-*b* represent lines of constant values of an RF signal characteristic (e.g., lines of constant signal strength), including a region of a highest value of the RF signal characteristic (e.g., the line circling the region of signal strength above a value of 4). Furthermore, both the first attenuation profile 550-*a* and the second attenuation profile 550-*b* have high-gradient areas of the RF signal characteristic that are suggestive of a boundary of an obstruction 405, such as obstructions 405 described with reference to FIGS. 4 and 5.

As shown between the first attenuation profile 550-*a* and the second attenuation profile 550-*b*, the contours of the values of the RF signal characteristic have not moved in regions away from the detected obstruction 405. A difference between the first attenuation profile 550-*a* and the second attenuation profile 550-*b*, however, is that the detected obstruction 405 has moved with respect to the field of view of the satellite terminal auxiliary antenna 151. According to aspects of the present disclosure, the detected movement of the obstruction 405 can be used to determine a diagnostic condition of a communications satellite 121 in a communications satellite system 120, such as a diagnostic condition with respect to communications between a satellite terminal 150 and one or more of the first communications satellite 121-*a*, the second communications satellite 121-*b*, or the third communications satellite 121-*c*.

For example, the movement of the obstruction 405, as detected by a comparison between the first attenuation profile 550-*a* and the second attenuation profile 550-*b*, may indicate that signals 115 are no longer received from an auxiliary satellite system 110 in areas that correspond to a location of the first communications satellite 121-*a*. Therefore, the comparison 600 may suggest that an obstruction 405 is blocking communications between the satellite terminal communications antenna and the first communications satellite 121-*a*. In such examples, an indication may be sent, for instance, to relocate a satellite terminal antenna assembly 155, or to clear a detected obstruction 405.

In another example, the movement of the obstruction 405, as detected by a comparison between the first attenuation profile 550-*a* and the second attenuation profile 550-*b*, may indicate that signals 115 from an auxiliary satellite system 110 have a high gradient in an area that corresponds to a location of the second communications satellite 121-*b*. Therefore, the comparison 600 may suggest that the obstruction 405 is moving towards a line-of-sight between the satellite terminal auxiliary antenna 151 and the second communications satellite 121-*b*, and that communications between the satellite terminal communications antenna 152 and the second communications satellite 121-*b* may be degraded, or have an impending failure. In such examples, an indication may be sent, for instance, to relocate a satellite terminal antenna assembly 155, or clear the obstruction 405, despite communications being supported between a satellite terminal 150 and the second communications satellite 121-*b*.

In another example, the movement of the obstruction 405, as detected by a comparison between the first attenuation profile 550-*a* and the second attenuation profile 550-*b*, may indicate that signals 115 from an auxiliary satellite system 110 are not affected in an area that corresponds to a location of the third communications satellite 121-*c*. Therefore, the comparison 600 may suggest that the movement of an obstruction 405 is unlikely to affect communications between the satellite terminal communications antenna 152 and the third communications satellite 121-*c*. In such examples, despite the detected movement of the obstruction 405, the comparison may not indicate a diagnostic condition with a the third communications satellite 121-*c*, and the system may not send a diagnostic indication.

Figure 7:
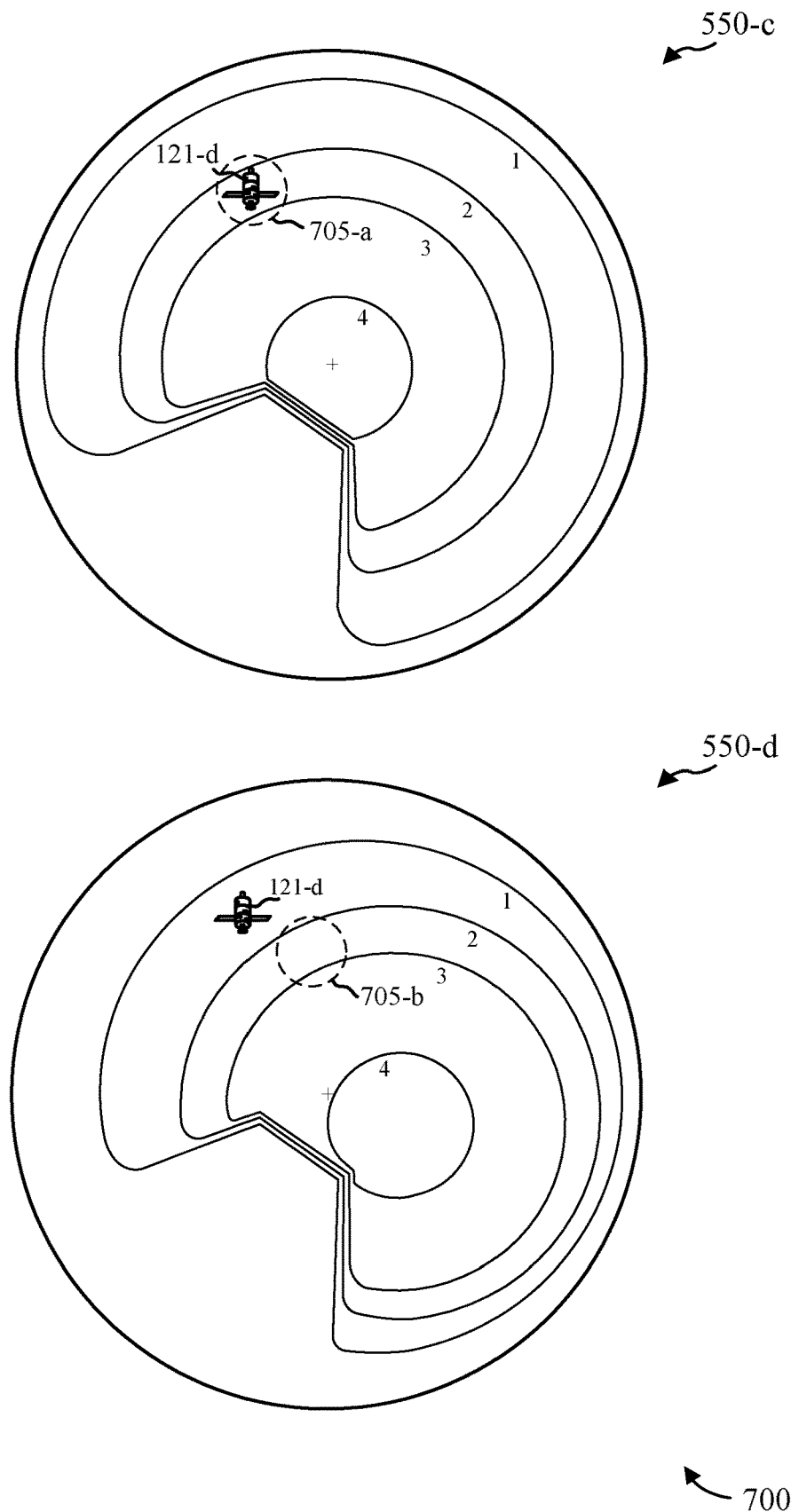
FIG. 7 illustrates a comparison of attenuation profiles that may suggest a misalignment of a satellite terminal antenna assembly, in accordance with aspects of the present disclosure.

FIG. 7 illustrates a comparison 700 of attenuation profiles 550 that may suggest a misalignment of a satellite terminal antenna assembly 155, in accordance with aspects of the present disclosure. As illustrated in the present example, the comparison 700 is made between a first attenuation profile 550-*c* and a second attenuation profile 550-*d*. The attenuation profiles 550-*c* and 550-*d* may be generated from signals 115 of auxiliary satellites 111 in an auxiliary satellite system 110 as described with reference to FIG. 1, 2, 3, 4, 5, or 6. The comparison 700 can made with respect to communications satellite 121-*d*, which may be an example of a communications satellite 121 of a communications satellite system 120 as described with reference to FIG. 1, 2, 3, 4, 5, or 6. For illustrative purposes, the communications satellite 121-*d* is shown in its corresponding locations on the attenuation profiles 550-*a* and 550-*b*.

As shown, attenuation profiles 550-*c* and 550-*d* map an RF signal characteristic with respect to a field of view of a satellite terminal auxiliary antenna 151 (e.g., a satellite terminal antenna assembly 155), and may be an example of aspects of attenuation profiles 550 described with reference to FIG. 5 or 6. Both the first attenuation profile 550-*c* and the second attenuation profile 550-*d* have high-gradient areas of the RF signal characteristic that are suggestive of an obstruction, such as obstructions 405 described with reference to FIGS. 4 and 5. Furthermore, both the first attenuation profile 550-*c* and the second attenuation profile 550-*d* have lines representing constant values of an RF signal characteristic (e.g., lines of constant signal strength, etc.), including a region of a highest value of the RF signal characteristic (e.g., the line circling the region of SNR above a value of 4).

As shown between the first attenuation profile 550-*c* and the second attenuation profile 550-*d*, the region of high gradient has not moved, suggesting that the obstruction has remained in the same position between the first attenuation profile 550-*c* and the second attenuation profile 550-*d*. A difference between the first attenuation profile 550-*c* and the second attenuation profile 550-*d*, however, is that the region of highest RF signal characteristic, and the surrounding contours have moved (e.g., with respect to a boundary or reference feature, etc.). According to aspects of the present disclosure, the detected movement of the contours of RF signal condition (e.g., the movement of the region of the highest value of the RF signal condition) can be used to determine a diagnostic condition of a satellite in a communications satellite system, such as a diagnostic condition with respect to communications between the satellite terminal 150 and the communications satellite 121-*d*.

For example, a satellite terminal antenna assembly 155, having a satellite terminal communications antenna 152 and a satellite terminal auxiliary antenna 151, may have been installed in a manner such that the satellite terminal communications antenna boresight 260 was aligned with the communications satellite 121-*d* (e.g., having a focal area 705-*a* including the communications satellite 121-*d*). In this installed orientation, the satellite terminal auxiliary antenna 151 may have a peak gain aligned in a predominantly vertical direction, such that signals from auxiliary satellites 111 of an auxiliary satellite system 110 are received with a highest signal strength in an overhead direction. Thus, the first attenuation profile 550-*c* may represent an as-installed condition where the represented RF signal characteristic is highest in an overhead direction near the origin of the first attenuation profile 550-*c*, and for illustrative purposes, the focal area 705 can be aligned with the communications satellite 121-d. In some cases, attenuation profile 550-c may be normalized for distance of transmitting satellites for signals 115 or atmospheric effects to show a larger effect from the antenna gain of satellite terminal auxiliary antenna 151.

In comparison, the second attenuation profile 550-d shows the region of the highest RF signal characteristic has shifted (e.g., shifted down and to the right in comparison to the first attenuation profile 550-c). This may be caused, for example, by a change in orientation of the satellite terminal auxiliary antenna 151, which may be detected by various devices performing the comparison 700. In examples where the satellite terminal auxiliary antenna 151 and the satellite terminal communications antenna 152 are coupled together in a satellite terminal antenna assembly, such as satellite terminal antenna assembly 155 described with reference to FIG. 1 or 2, the detected change in orientation of the satellite terminal auxiliary antenna 151 may suggest a change in orientation of the satellite terminal communications antenna 152. For example, the shift in RF signal characteristic contours between the first attenuation profile 550-c and the second attenuation profile 550-d may have a corresponding shift in focal area from focal area 705-a to focal area 705-b. Because focal area 705-b no longer aligns with the communications satellite 121-d, a satellite terminal 150 may experience degraded or failed communications with the communications satellite 121-d. Therefore, a comparison between two attenuation profiles 550 (e.g., attenuation profiles 550-c and 550-d) may be used to detect and/or suggest a diagnostic condition associated with a change in alignment of a satellite terminal auxiliary antenna 151. Upon detecting a change in alignment of a satellite terminal auxiliary antenna 151, an indication may be sent, for instance, to realign a satellite terminal antenna assembly 155.

Figure 8:
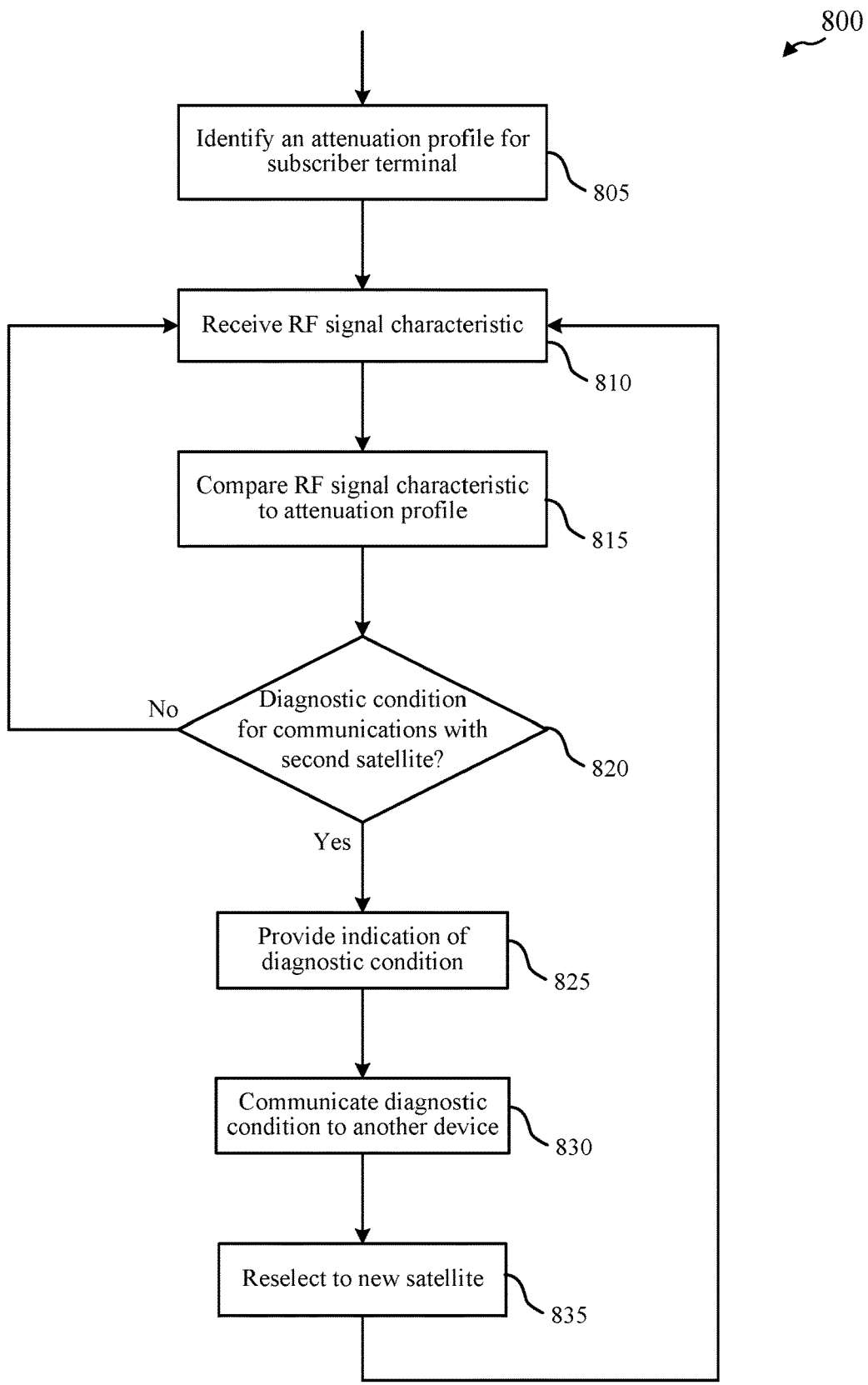
FIG. 8 shows a flowchart illustrating an exemplary method for determining and applying an attenuation profile in a satellite communication system, in accordance with aspects of the present disclosure.

FIG. 8 shows a flowchart illustrating an exemplary method 800 for determining and applying an attenuation profile in a satellite communication system, in accordance with aspects of the present disclosure. The steps of the exemplary method 800 may be performed by various devices of a satellite communication environment, including a satellite terminal 150 having a satellite terminal communications antenna 152 and a satellite terminal auxiliary antenna 151, which may be coupled to each other in a satellite terminal antenna assembly 155. The satellite terminal 150 may be configured to receive signals from at least a first satellite, which may be an example of aspects of one or more satellite(s) 111 of an auxiliary satellite system 110 described with reference to FIGS. 1 through 7. The satellite terminal 150 may also be configured for communications with a second satellite, which may be an example of aspects of one or more communications satellite(s) 121 of a communications satellite system 120, as described with reference to FIGS. 1 through 7.

At step 805, the exemplary method may include identifying an attenuation profile 550 for the satellite terminal 150. In various examples, the attenuation profile 550 for the satellite terminal 150 can be associated with transmissions of a first satellite, or multiple satellites from a first satellite system (e.g., signals 115 from one or more satellite(s) 111 of an auxiliary satellite system 110) to be received by the satellite terminal 150. The attenuation profile 550 may map one or more RF signal characteristics 325 associated with the first satellite (or multiple satellites) from the first satellite system with respect to a field of view of the satellite terminal 150. In various examples, the RF signal characteristics 325 may include any one or more of an RF signal strength, an RF signal attenuation, an RF signal interference, an RF signal-to-noise ratio, an RF signal-to-noise-plus-interference ratio, or the like. In some examples the RF signal characteristic 325 may be a binary characteristic that refers to whether or not an RF signal is to be received from the first satellite or the plurality of satellites from the first satellite system, or whether a received signal is to be above or below a threshold. Identifying an attenuation profile 550 for the satellite terminal 150 according to step 805 may be carried out by the satellite terminal 150 itself, or any other device of a satellite communications environment that performs a comparison of an RF signal characteristic 325 of a subsequent signal 115 to the attenuation profile 550, such as a CPE 160, a gateway 130, or a network device 141 as described with reference to FIG. 1.

In some examples, identifying an attenuation profile 550 for the satellite terminal 150 according to step 805 may include aspects of determining the attenuation profile 550. In various examples determining the attenuation profile 550 may depend on one or both of predetermined characteristics of transmissions from the first satellite (or multiple satellites from the first satellite system), or measured transmissions from the first satellite (or multiple satellites from the first satellite system). Determining an attenuation profile 550 may include any one of more of the aspects of determining an attenuation profile described with reference to FIG. 3, 4, or 5.

For example, determining an attenuation profile may include determining characteristics of signals to be transmitted from the first satellite (e.g., one or more auxiliary satellites 111 of an auxiliary satellite system 110) and to be received at a satellite terminal (e.g., received at a satellite terminal auxiliary antenna 151). In various examples, the determined characteristics may include such characteristics as a satellite position, a satellite path, a satellite transmission power, a satellite terminal auxiliary antenna gain, a satellite terminal antenna assembly position, or the like. In some examples, the determined attenuation profile 550 is based only on predetermined characteristics, and does not include any measurements of signals received at the satellite terminal 150.

In some examples a determined attenuation profile 550 may be based on signals received at the satellite terminal. For example, determining an attenuation profile may include measuring signals transmitted by a first satellite at the satellite terminal 150 (e.g., measuring signals 115 transmitted by an auxiliary satellite 111 (or multiple satellites) and received by a satellite terminal auxiliary antenna 151). Signal measurements may be employed by calculations or other signal processing to determine such RF signal characteristics as RF signal strength, RF signal attenuation, RF signal interference, RF signal-to-noise ratio, or RF signal-to-interference-plus-noise ratio (SINR), or the like. While measurements of signals may be taken at satellite terminal 150, the calculation of associated RF signal characteristics may be carried out by any one or more of the satellite terminal 150, a CPE 160, a gateway 130, or a network device 141 as described with reference to FIG. 1.

Determining an attenuation profile may also include associating the measurements taken at the satellite terminal 150 with location information of the first satellite (e.g., location information associated with one or more auxiliary satellites 111 of an auxiliary satellite system 110). In some examples, such as those where the first satellite is a GNSS satellite, the signals 115 received from the first satellite include ephemeris data, which may be decoded by the satellite terminal 150 and/or transmitted to another device such as a CPE 160, a gateway 130, or a network device 141. In other examples a time stamp may be received or otherwise associated with the signal(s) 115, and used to determine the position of the auxiliary satellite 111 at the time of transmission by way of a lookup table or other orbital calculation performed by any one or more of the satellite terminal 150, a CPE 160, a gateway 130, or a network device 141. Various mapping techniques may be used in determining an attenuation profile. For instance, the attenuation profile may be based on a 2-dimensional polar mapping, with principal angles including an elevation angle and an azimuth angle from the perspective of the satellite terminal 150. In other examples the mapping may be based on a Cartesian coordinate system at a reference plane. In various examples, each location of the map may be associated with an RF signal characteristic.

Identifying an attenuation profile 550 for the satellite terminal 150 according to step 805 may also include storing the attenuation profile 550. In some examples, the same device of a satellite communications environment which determined the attenuation profile 550 may also store the attenuation profile 550. For example, an attenuation profile 550 may be determined by a portion of a satellite terminal 150, such as a satellite terminal processor, and also stored by a portion of the satellite terminal 150, such as a satellite terminal memory. In some examples the device that determines an attenuation profile 550 may communicate aspects of the profile to another device of a satellite communications environment to store the attenuation profile 550. For example, an attenuation profile 550 may be determined by a network device 141 based on signals 115 measured at a satellite terminal 150, and subsequently communicate the attenuation profile 550 to the satellite terminal 150 and/or a portable device (e.g., a portable CPE 160) that may be used for diagnostic purposes.

In some examples, identifying an attenuation profile 550 according to step 805 may include adjusting the attenuation profile 550 over time. For example, a satellite terminal 150 may continue to collect measurements of signals 115 from a first satellite or multiple satellites from a first satellite system (e.g. one or more auxiliary satellites 111 of an auxiliary satellite system 110). Such adjustments may occur automatically over time, at periodic intervals, and/or triggered by a detected event such as a detected movement of a satellite terminal antenna assembly 155.

At step 810, the exemplary method 800 may include receiving an RF signal characteristic. In some examples, step 810 may include receiving an RF signal characteristic associated with a single location of a transmitting satellite. In other examples, step 810 may include receiving another attenuation profile or portion of an attenuation profile associated with an RF signal characteristic generated based on signals 115 received after the attenuation profile 550 identified in step 805. In some examples, receiving an RF signal characteristic according to step 810 may be triggered by a detected event, such as detecting a signal condition associated with communications with a communications satellite (e.g., a communications satellite 121 of a communications satellite system 120). In other examples receiving an RF signal characteristic may be automatic, and/or ongoing in a continuous or periodic manner.

Receiving the RF signal characteristic may be carried out by any device of a satellite communications environment that performs a comparison of the received RF signal characteristic 325 to the attenuation profile 550 identified in step 805, which may include any one or more of a satellite terminal 150, a CPE 160, a gateway 130, or a network device 141 as described with reference to FIG. 1. For example, the RF signal characteristic may be measured and/or calculated at a satellite terminal 150, and be subsequently received by another portion of the satellite terminal 150, and/or transmitted to another device such as a portable CPE 160 that may be used for diagnostic purposes.

At step 815, the exemplary method 800 may include comparing the received RF signal characteristic to the attenuation profile 550 identified in step 805. The comparison of step 815 may, in some examples, include aspects of one or both of comparisons 600 or 700 described with reference to FIGS. 6 and 7. For example, the comparison at step 815 may be between an attenuation profile 550 identified at step 805 and an attenuation profile 550 received at step 815. In some examples, a first attenuation profile 550 and a second attenuation profile 550 can be compared directly, such as when the attenuation profiles 550 are compared at the same device that generated the profile (e.g., a satellite terminal 150 configured to generate a first attenuation profile 550 and a second attenuation profile 550).

In some examples, step 815 may include a comparison between a point measurement and an attenuation profile 550. In some examples, there may be no signal 115 from the first satellite (e.g., one or more auxiliary satellites 111 from an auxiliary satellite system 110) at a location where there should be one, or vice versa. In some examples, the comparison may be between a binary RF signal characteristic and an associated binary attenuation profile (e.g., a positive condition and a null condition, or an RF signal characteristic above/below a threshold). The comparison of step 820 may be performed by various devices of a satellite communication environment, such as one or more of a satellite terminal 150, a CPE 160, a gateway 130, or a network device 141 as described with reference to FIG. 1.

At step 820, the exemplary method may include identifying a diagnostic condition for communications with a second satellite. Identifying a diagnostic condition according to step 820 may include aspects of determining an obstruction as described with reference to FIG. 6, and/or determining a misalignment as described with reference to FIG. 7. The diagnostic condition identified at step 820 may be a weighted indication (e.g., a high likelihood of blockage, a low likelihood of blockage, an indication of impending blockage, etc.). In various examples, identifying a diagnostic condition according to step 820 may be performed by various devices of a satellite communications environment, such as one or more of a satellite terminal 150, a CPE 160, a gateway 130, or a network device 141 as described with reference to FIG. 1. In some examples, the device that performs the identification of a diagnostic condition may or may not be the same device that performs a comparison according to step 815. In such examples, the device that performs the identification of step 820 may receive a result of a comparison from the device that performs the respective comparison of step 815. In the event that no diagnostic condition is identified, the exemplary method 800 may return to step 810, and receive another measured RF signal characteristic. In the event that a diagnostic condition is identified, the exemplary method 800 may proceed to step 825.

At step 825, the exemplary method 800 may include providing an indication of the identified diagnostic condition. For example, a device that performs the identification of step 820 may be configured to provide a visible indication such as a message or an indicator light prompting any one or more of a service call, providing diagnostic information, suggesting a realignment process, or the like. Providing an indication of the identified diagnostic condition may also include providing an audible indication such as an alarm or a spoken indication. In some examples the device that performs the identification of step 820 may send an indication to another device, such as a control signal or an indication message. The other device may subsequently provide a visible or audible indication, and/or use the control signal to control and/or trigger aspects of the operation of the satellite communications environment. Providing an indication of the identified diagnostic condition according to step 820 may be performed by various devices of a satellite communication environment, such as one or more of a satellite terminal 150, a CPE 160, a gateway 130, or a network device 141 as described with reference to FIG. 1.

At step 830, the exemplary method 800 may include communicating the identified diagnostic condition to another device of the satellite communications environment. In some examples, providing a message or control signal indicative of the diagnostic condition identified at step 825. For example, the communication may indicate a potential obstruction or misalignment of a satellite terminal antenna assembly 155. In some examples, communicating the identified diagnostic condition may include communicating the inputs and/or result of a comparison performed at step 815. For example, the communication may include a received RF signal characteristic and a value of an identified attenuation profile that the received characteristic is being compared to. Communicating the identified diagnostic condition to another device according to step 830 may be performed by various devices of a satellite communication environment, such as one or more of a satellite terminal 150, a CPE 160, a gateway 130, or a network device 141 as described with reference to FIG. 1.

At step 835, the exemplary method 800 may include reselecting to a new satellite based on the identified diagnostic condition (e.g., a different communications satellite 121 of a communications satellite system 120). For example, the diagnostic condition identified at step 820 may indicate a likely blockage, or an impending blockage. In other examples the diagnostic condition identified at step 820 may suggest a misalignment in a direction of another satellite. In some examples a satellite terminal 150 may be able to select a new satellite for communications (e.g., via a motorized positioning control or beamforming, etc.). Therefore, when a diagnostic condition relates to a degraded or failed communication link related to a blockage, a satellite terminal may reselect to improve the quality of a communications link in the satellite communication system. Reselecting to a new satellite according to step 835 by may be performed by various devices of a satellite communication environment, such as one or more of a satellite terminal 150, a CPE 160, a gateway 130, or a network device 141 as described with reference to FIG. 1. For example, a satellite terminal 150 may self-select to establish communications with a new satellite. In other examples, the determination to reselect to a new satellite may be performed by a CPE 160 or a network device 141, and an indication of the determination may be sent to the satellite terminal 150.

Thus, the exemplary method 800 may provide for determining and applying an attenuation profile in a satellite communication system. It should be noted that the exemplary method 800 is just one implementation and that the operations of the exemplary method 800 may be rearranged, omitted, or otherwise modified such that other implementations are possible.

Figure 9:
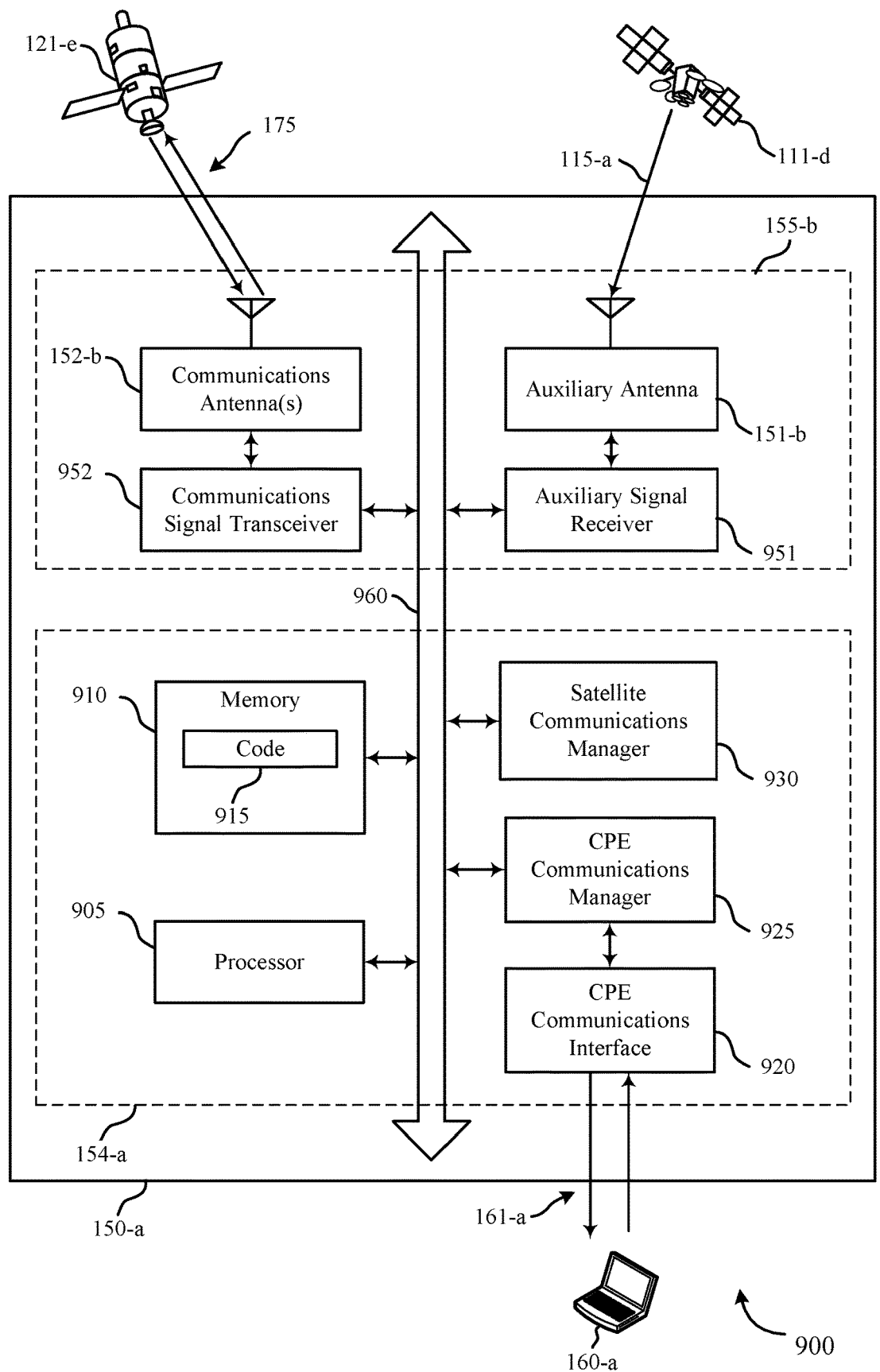
FIG. 9 shows a block diagram illustrating a satellite communications environment 900, in accordance with aspects of the present disclosure.

FIG. 9 shows a block diagram illustrating a satellite communications environment 900, in accordance with aspects of the present disclosure. The satellite communications environment 900 includes a satellite terminal 150-*a*, which may be an example aspects of satellite terminals 150 described with reference to FIGS. 1 through 8. The satellite terminal 150-*a* may include a processor 905, and memory 910. The memory 910 may store computer-readable, computer-executable software or firmware code 915 including instructions that, when executed by the processor, cause the satellite terminal 150-*a* to perform various functions described herein (e.g., determining an attenuation profile, identifying a diagnostic condition based on a comparison of an RF signal characteristic with an identified attenuation profile, etc.). In some examples, the code 915 may not be directly executable by the processor but may cause a computer (e.g., when compiled and executed) to perform functions described herein. The processor 905 may include an intelligent hardware device, (e.g., a CPU, a microcontroller, an ASIC, etc.). Each of the components of the satellite terminal 150-*a* may communicate, directly or indirectly, with one another (e.g., via one or more buses 960).

The satellite terminal 150-*a* may be configured to communicate with one or more communications satellites (e.g., communications satellite 121-*e*), which may be an example of aspects of a communications satellite 121 of a communications satellite system 120 as described with reference to FIGS. 1 through 8. The satellite terminal 150-*a* may be configured to establish a communications link with the communications satellite 121-*e* employing a satellite terminal communications antenna 152-*b* and a communications signal transceiver 952. The communications link may support bi-directional communications via signals 175 between the satellite terminal 150-*a* and the communications satellite 121-*e* (e.g., forward link signals 172 and/or return link signals 173 of FIG. 1).

The communications signal transceiver 952 may include various circuits and/or processors to support receiving, transmitting, converting, coding, and/or decoding of signals 175. For example, the communications signal transceiver 952 may include a modem to modulate the packets and provide the modulated packets to the satellite terminal communications antenna 152-*b* for transmission, and to demodulate packets received from the satellite terminal communications antenna 152-*b*. As illustrated in the present example, the satellite terminal 150-*a* includes a single satellite terminal communications antenna 152-*b*. However, in some cases the satellite terminal 150-*a* may have more than one satellite terminal communications antenna 152-*b*, which may be capable of concurrently transmitting or receiving multiple wireless transmissions and/or be configured to support various beamforming techniques.

The satellite terminal 150-*a* may be configured to receive signals 115-*a* from one or more auxiliary satellites (e.g., auxiliary satellite 111-*d*), which may be an example of aspects of an auxiliary satellite 111 of an auxiliary satellite system 110 described with reference to FIGS. 1 through 8. In some examples the auxiliary satellite 111-*d* may be a GNSS satellite (e.g., a GPS satellite or a GLONASS satellite), and may transmit signals that are used for positioning purposes. The satellite terminal 150-*a* may receive signals 115-*a* via a satellite terminal auxiliary antenna 151-*b* and an auxiliary signal receiver 951. The auxiliary signal receiver 951 may include various circuits and/or processors to support receiving, converting, and/or decoding of signals 115-*a*. For example, the auxiliary signal receiver 951 may include a modem to demodulate packets received from the satellite terminal auxiliary antenna 151-*b* via signals 115-*a*. In some examples the auxiliary signal receiver 951 may include circuits and/or processors configured to determine a position of the satellite terminal 150-a, and/or associate signals 115-a with a position of the auxiliary satellite 111-d when respective signals 115-a are transmitted.

The satellite terminal 150-a may be configured to support communications with one or more CPEs (e.g., CPE 160-a) via wired or wireless connection(s) 161-a. The satellite terminal 150-a may employ a CPE communications interface 920 supporting any number of wired and/or wireless links between the satellite terminal 150-a and the one or more CPEs 160, which may be managed by a CPE communications manager 925. As illustrated by the present example, the CPE communications manager 925 may implemented as a separate module of the satellite terminal 150-a, which may be configured as a standalone set of instructions (e.g., a software module having a set of instructions stored in a standalone portion of memory) and/or a separate processing element (e.g., a standalone CPU, microcontroller, IC, ASIC, FPGA module, or the like). In other examples, some or all of the operations of the CPE communications manager 925 may be caused by instructions stored in the memory 910 (e.g., a portion of the code 915), which in some examples may be performed by the processor 905.

The satellite terminal 150-a may include a satellite communications manager 930, configured to manage various aspects of communications between the satellite terminal 150-a and each of the communications satellite 121-a and the auxiliary satellite 111-d. The satellite communications manager 930 may control and/or configure various components of the satellite terminal perform the one or more operations of the exemplary method 800 described with reference to FIG. 8. For example, the satellite communications manager 930 may manage aspects of the operation of the satellite terminal 150-a to identify an attenuation profile mapping an RF signal characteristic associated with the auxiliary satellite 111-d, receive a signal transmission from the auxiliary satellite 111-d, determine a measured RF signal characteristic based on the received signal transmission, compare the measured RF signal characteristic and the attenuation profile, and identify a diagnostic condition for communication between the satellite terminal 150-a and the communications satellite 121-e based at least in part on the comparison.

As illustrated by the present example, the satellite communications manager 930 may be implemented as a separate module of the satellite terminal 150-a, which may be configured as a standalone set of instructions (e.g., a software module having a set of instructions stored in a standalone portion of memory) and/or a separate processing element (e.g., a standalone CPU, microcontroller, IC, ASIC, FPGA module, or the like). In other examples, some or all of the operations of the satellite communications manager 930 may be caused in response to instructions stored in the memory 910 (e.g., a portion of the code 915) being executed by a processor, which in some examples may be performed by the processor 905.

In various examples, the components of the satellite terminal 150-a may be divided into subassemblies, where various components may be included in a subassembly either in part, or in its entirety. For example, the satellite terminal 150-a may include a satellite terminal subassembly 155-b and a satellite terminal receiver 154-a, which may be referred to as an ODU and an IDU, respectively. The satellite terminal antenna assembly 155-b may include the communications antenna(s) 152-b, the communications signal transceiver 952, the satellite terminal auxiliary antenna 151-b, and the auxiliary signal receiver 951, along with any additional circuitry, processing, and/or memory to support the functionality of the satellite terminal antenna assembly 155-b. The satellite terminal receiver 154-a may include the satellite communications manager 930, the CPE communications manager 925, the CPE communications interface 920, processor 905, and memory 910, along with any additional circuitry, processing, and/or memory to support the functionality of the satellite terminal receiver 154-a. The satellite terminal antenna assembly 155-b may communicate with the satellite terminal receiver 154-a via a bus 960, which in various examples may support wired and/or wireless communications. Although the components of the satellite terminal 150-a are shown as being distributed between two subassemblies (e.g., the satellite terminal antenna assembly 155-b and the satellite terminal receiver 154-a), the components of a satellite terminal 150, or their respective functionality, may be distributed into any number of subassemblies, or may be a single integrated assembly.

Figure 10:
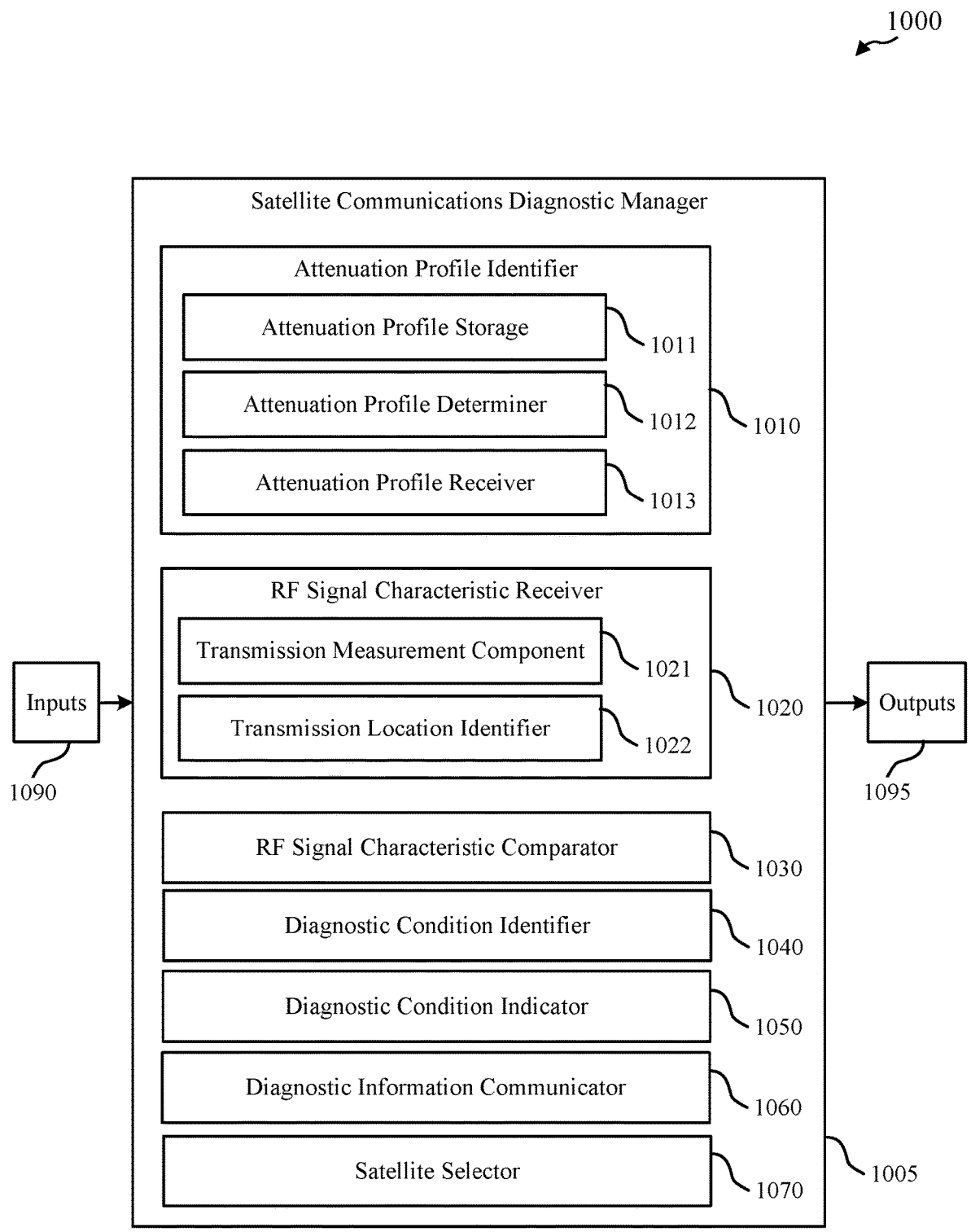
FIG. 10 shows a block diagram of a satellite communications diagnostic manager, in accordance with aspects of the present disclosure.

FIG. 10 shows a block diagram 1000 of a satellite communications diagnostic manager 1005, in accordance with aspects of the present disclosure. The satellite communications diagnostic manager 1005 may be a portion of any of a satellite terminal 150, a CPE 160, a gateway 130, or a network device 141. In some examples, the described portions of the satellite communications diagnostic manager 1005 may be distributed across two or more of a satellite terminal 150, a CPE 160, a gateway 130, or a network device 141. For example, the satellite communications diagnostic manager 1005 may be a portion of a satellite terminal 150, operating with a shared processor and memory of the satellite terminal 150. In other examples the satellite communications diagnostic manager 1005 may be a standalone component of a satellite terminal 150, receiving inputs from and sending outputs to other components of the satellite terminal 150. In other examples, the satellite communications diagnostic manager 1005 may be or form a portion of a CPE 160 or a network device 141, which in some examples may be a stand-alone diagnostics device. The satellite communications diagnostic manager 1005 may also be or include a processor. Each of the components of the satellite communications diagnostic manager 1005 may be in communication with each other to provide the functions described herein. The satellite communications diagnostic manager 1005 may be configured to receive inputs 1090, and deliver outputs 1095 by various means, including wired or wireless communications, control interfaces, user interfaces, or the like.

The satellite communications diagnostic manager 1005 may include an attenuation profile identifier 1010, which may perform any of the aspects of identifying, receiving, determining, or selecting an attenuation profile described with reference to FIGS. 1 through 9. For example, the attenuation profile identifier 1010 may include attenuation profile storage 1011 (e.g., RAM, ROM, or other memory), which can store one or more attenuation profiles which may be later used in a comparison with an RF characteristic. In some examples an attenuation profile may be determined by the attenuation profile identifier 1010, such as by an attenuation profile determiner 1012 which can receive information to determine an attenuation profile directly from inputs 1090 or from information received from an RF signal characteristic receiver 1020. In various examples a stored attenuation profile may be pre-programmed in the attenuation profile storage 1011, or may be received from inputs 1090 by an attenuation profile receiver 1013. A stored attenuation profile may be based on predetermined characteristics of an auxiliary satellite and/or a satellite terminal. In some examples a stored attenuation profile may be based on measurements of signals received at a satellite terminal 150.

The satellite communications diagnostic manager 1005 may include an RF signal characteristic receiver 1020, which may perform any of the aspects of receiving an RF signal characteristic for a transmission from an auxiliary satellite as described with reference to FIGS. 1 through 9. For example, the RF signal characteristic receiver 1020 may receive an RF signal characteristic to be compared to an attenuation profile. In some examples, the RF signal characteristic receiver 1020 may receive a plurality of RF signal characteristics from which an attenuation profile may be determined by the attenuation profile determiner 1012. In some examples the RF signal characteristic receiver 1020 may include a transmission measurement component 1021 to measure a signal from an auxiliary device received via inputs 1090, and may also include a transmission location identifier 1022 to identify the location of a transmitting auxiliary device. Thus, in some examples the RF signal characteristic receiver 1020 may associate each of the transmissions from an auxiliary satellite with a location of the respective transmitting satellite.

The satellite communications diagnostic manager 1005 may include an RF signal characteristic comparator 1030 which may perform any of the aspects of comparing a measured RF signal characteristic and an attenuation profile as described with reference to FIGS. 1 through 10. For example, the RF signal characteristic comparator 1030 make a comparison between an attenuation profile and a received RF signal characteristic, which may be represented by a single data point or another attenuation profile. The RF signal characteristic comparator 1030 may identify reference features such as areas of high signal gradient, or boundaries between binary conditions of an attenuation profile as previously described.

The satellite communications diagnostic manager 1005 may include diagnostic condition identifier 1040, which may perform any of the aspects of identifying a diagnostic condition for communications between a satellite terminal and a communications satellite as described with reference to FIGS. 1 through 10. For example, the diagnostic condition identifier may receive the results of a comparison from the RF signal characteristic comparator 1030 and identify an appearance of obstruction 405, a movement of an obstruction 405, a growth of an obstruction 405, or a misalignment of a satellite terminal antenna assembly 155 as previously described.

The satellite communications diagnostic manager 1005 may include an diagnostic condition indicator 1050, which may perform any of the aspects of indicating a diagnostic condition as described with reference to FIGS. 1 through 10. For example, the diagnostic condition indicator 1050 may provide a notification to a user, such as an illuminated light, a message, an audible alarm, or a vocal description of an identified diagnostic condition. The diagnostic condition indicator 1050 may provide such an indication via outputs 1095, which may employ any device or component suitable for providing the indication, such as a light, an LED, a display device, a speaker, or the like.

The satellite communications diagnostic manager 1005 may include an diagnostic information communicator 1060, which may perform any of the aspects of communicating diagnostic information to other devices as described with reference to FIGS. 1 through 10. For example, the diagnostics information communicator may manage the communication of one or more of an attenuation profile, a measured RF signal characteristic for a transmission from an auxiliary satellite, a difference between an attenuation profile and a measured RF signal characteristic, or an identified diagnostic condition. The diagnostic information communicator 1060 may provide and/or manage such communications by any suitable device that provides outputs 1095.

The satellite communications diagnostic manager 1005 may include satellite selector 1070, which may perform any of the aspects of selecting a different communications satellite for receiving a communication service based on identified diagnostic condition, as described with reference to FIGS. 1 through 10. For example, based on an obstruction or misalignment identified by the diagnostic condition identifier 1040, the satellite selector 1070 may provide control signals to a satellite terminal 150, or other suitable indication via outputs 1095 to select and/or control the selection of a different satellite for communications.

The components of the satellite communications diagnostic manager 1005, individually or collectively, may be implemented with at least one application-specific integrated circuit (ASIC) adapted to perform some or all of the applicable features in hardware. Alternatively, the features may be performed by one or more other processing units (or cores), on at least one integrated circuit (IC). In other examples, other types of integrated circuits may be used (e.g., Structured/Platform ASICs, a FPGA, or another semi-custom IC), which may be programmed in any manner known in the art. The features may also be implemented, in whole or in part, with instructions embodied in a memory, formatted to be executed by one or more general or application-specific processors.

Figure 11:
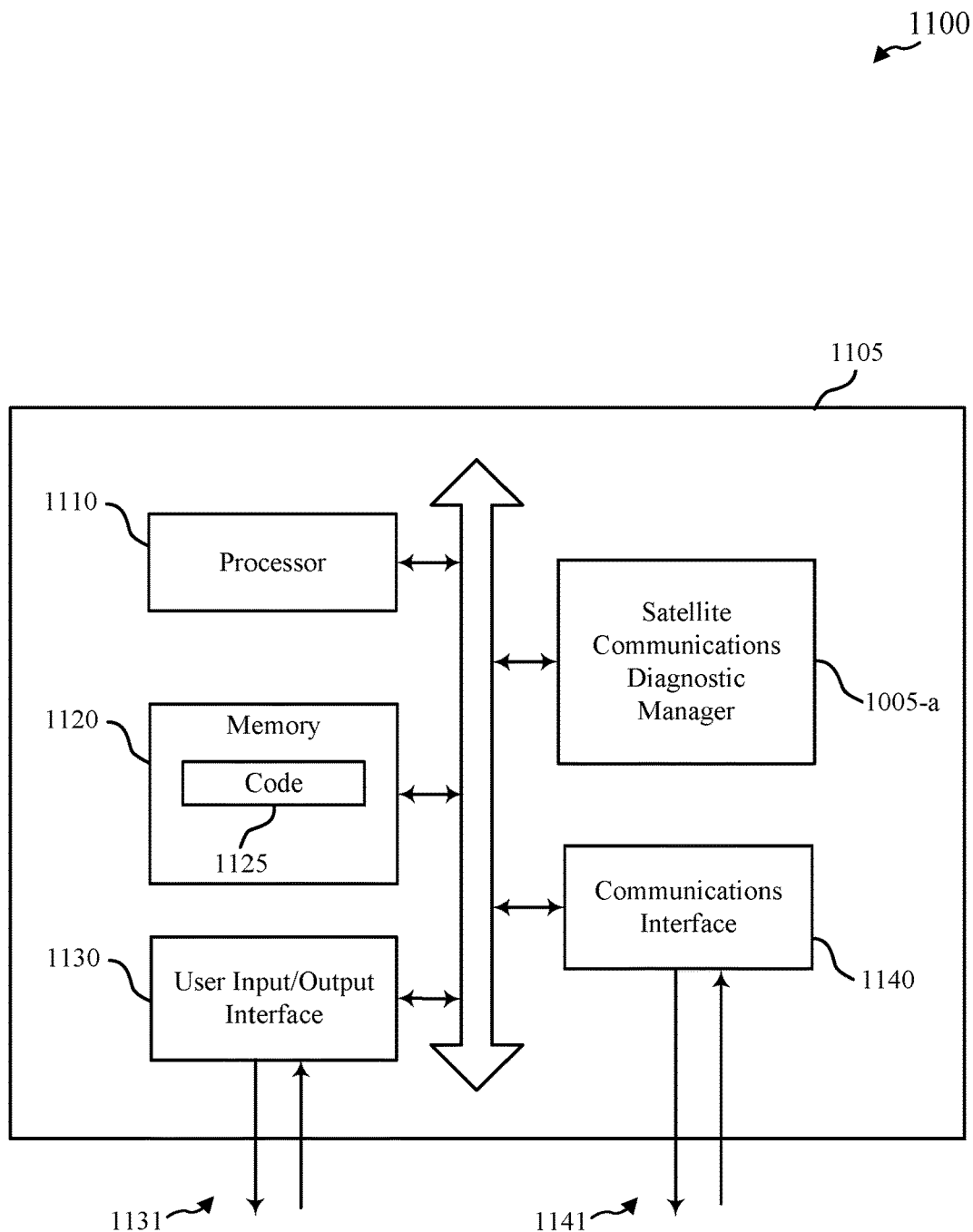
FIG. 11 illustrates a block diagram of an apparatus configured for identifying a diagnostic condition based on a comparison between a received RF signal characteristic and an attenuation profile, in accordance with aspects of the present disclosure.

FIG. 11 illustrates a block diagram 1100 of an apparatus 1105 configured for identifying a diagnostic condition based on a comparison between a received RF signal characteristic and an attenuation profile, in accordance with aspects of the present disclosure. The apparatus 1105 may be any of a satellite terminal 150, a CPE 160, a gateway 130, or a network device 141 as described with reference to FIGS. 1 through 10. The apparatus 1105 may include a processor 1110, memory 1120, a user input/output interface 1130, and a communications interface 1140. The apparatus 1105 may also include a satellite communications diagnostic manager 1005-*a*, which may be an example of aspects of the satellite communications diagnostic manager 1005 described with reference to FIG. 10. Each of these modules may communicate, directly or indirectly, with one another (e.g., via one or more buses).

The memory 1120 may include RAM and/or ROM. The memory 1120 may store computer-readable, computer-executable software or firmware code 1125 including instructions that, when executed by the processor, cause the apparatus 1105 to perform various functions described herein (e.g., identifying a diagnostic condition for communications with a communications satellite, etc.). In some cases, the code 1125 may not be directly executable by the processor but may cause a computer (e.g., when compiled and executed) to perform functions described herein. The processor 1110 may include an intelligent hardware device, (e.g., a CPU, a microcontroller, an ASIC, etc.)

The user input/output interface 1130 may provide any suitable input and/or output functionality 1131 to support the operation of the apparatus 1105 by a user. For example, the user input/output interface 1130 may provide buttons, a keyboard, a wired or wireless control interface, and the like to receive inputs from user during the operation of the apparatus 1105. The user input/output interface may also provide lights, LEDs, a screen, a speaker, a wired or wireless control interface, and the like for providing output to the user to indicate various functions of the apparatus 1105 during operation.

The communications interface 1140 may provide bidirectional communications 1141, via one or more antennas, wired, or wireless links, with one or more networks, as described above. For example, the communications interface 1140 may communicate bi-directionally with any one or more of a satellite (e.g., a communications satellite 121 and/or an auxiliary satellite 111), a satellite terminal 150, a CPE 160, a gateway 130, or a network device 141. The communications interface 1140 may also include a modem to modulate the packets and provide the modulated packets to the antennas for transmission, and to demodulate packets received from the antennas.

As illustrated by the present example, the satellite communications diagnostic manager 1005-a may implemented as a separate module of the apparatus 1105, which may be configured as a standalone set of instructions (e.g., a software module having a set of instructions stored in a standalone portion of memory) and/or a separate processing element (e.g., a standalone CPU, microcontroller, IC, ASIC, FPGA module, or the like). In other examples, some or all of the operations of the satellite communications diagnostic manager 1005-a may be caused by instructions stored in the memory 1120 (e.g., a portion of the code 1125), which in some examples may be performed by the processor 1110.

Although the descriptions above recite an auxiliary satellite system and a communications satellite system (e.g., auxiliary satellite system 110 and communications satellite system 120 described with reference to FIGS. 1 through 8), a particular satellite may be included in both the auxiliary satellite system 110 and the communications satellite system 120. For example, a satellite terminal 150 may have established a communications link with a first communications satellite 121, and be receiving a signal from a second communications satellite 121 that is used to determine and/or compare to an attenuation environment. For various reasons, the satellite terminal 150 may subsequently establish a communications link with the second communications satellite 121. Thus, the second communications satellite 121 may be part of an auxiliary satellite system 110 in relation to determining and/or comparing to attenuation environment, and part of a communications satellite system 120 in relation to providing communications with the satellite terminal. In other words, at various times a satellite may perform the steps pertaining to either of an auxiliary satellite system 110 or a communications satellite system 120.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communications in a satellite communication system, the method comprising:
   identifying a first attenuation profile for a first position of a satellite terminal, the first attenuation profile mapping at least one radio frequency (RF) signal characteristic associated with a set of one or more satellites;
   identifying a second attenuation profile for a second position of the satellite terminal, the second attenuation profile mapping the at least one RF signal characteristic associated with the set of one or more satellites; and
   identifying, based at least in part on the first attenuation profile and the second attenuation profile, a diagnostic condition for communication between the satellite terminal and a satellite not included in the set of one or more satellites.

2. The method of claim 1, wherein identifying the first attenuation profile, identifying the second attenuation profile, or both, comprises:
   receiving transmissions via an antenna of the satellite terminal that is configured for unidirectional communications.

3. The method of claim 1, wherein the communication between the satellite terminal and the satellite not included in the set of one or more satellites comprises:
   communicating signals via an antenna of the satellite terminal that is configured for bidirectional communications.

4. The method of claim 1, wherein:
   identifying the first attenuation profile and identifying the second attenuation profile comprises receiving signals at a first antenna of the satellite terminal; and
   the communication between the satellite terminal and the satellite not included in the set of one or more satellites comprises communicating signals via a second antenna of the satellite terminal that is different than the first antenna.

5. The method of claim 4, wherein the first antenna is configured for unidirectional communications and the second antenna is configured for bidirectional communications.

6. The method of claim 1, further comprising:
   measuring, at the satellite terminal, a plurality of transmissions received from the set of one or more satellites;
   associating each of the plurality of transmissions with a respective location of a transmitting satellite; and
   determining the first attenuation profile and the second attenuation profile based at least in part on the measured plurality of transmissions and the respective locations of the transmitting satellite.

7. The method of claim 6, wherein determining the first attenuation profile and determining the second attenuation profile are based at least in part on a physical location of the satellite terminal.

8. The method of claim 1, wherein the at least one RF signal characteristic comprises one or more of:
   RF signal strength, RF signal attenuation, RF signal interference, RF signal-to-noise ratio, or RF signal-to-interference-plus-noise ratio, or any combination thereof.

9. The method of claim 1, further comprising:
   communicating, to a device outside the satellite terminal, at least one of: the first attenuation profile, the second attenuation profile, a difference between the first attenuation profile and the second attenuation profile, or the identified diagnostic condition.

10. The method of claim 1, further comprising
    triggering the communication between the satellite terminal and the satellite not included in the set of one or more satellites based at least in part on the identified diagnostic condition.

11. The method of claim 1, further comprising:
    selecting, from a plurality of satellites providing a communication service, the satellite not included in the set of one or more satellites based at least in part on the identified diagnostic condition.

12. The method of claim 1, wherein the set of one or more satellites comprises a global navigation satellite system constellation.

13. The method of claim 1, wherein the satellite not included in the set of one or more satellites is a geostationary satellite.

14. A satellite terminal, comprising:
    a first antenna;
    a second antenna;
    a processor;
    memory in electronic communication with the processor; and
    instructions stored in the memory and executable by the processor to cause the satellite terminal to:
        identify, based at least in part on first signaling received via the first antenna, a first attenuation profile for the satellite terminal, the first attenuation profile mapping at least one radio frequency (RF) signal characteristic associated with a set of one or more satellites;
        identify, based at least in part on second signaling received via the first antenna, a second attenuation profile for the satellite terminal, the second attenuation profile mapping the at least one RF signal characteristic associated with the set of one or more satellites;
        identify, based at least in part on the first attenuation profile and the second attenuation profile, a diagnostic condition for communication, via the second antenna, between the satellite terminal and a satellite not included in the set of one or more satellites.

15. The satellite terminal of claim 14, wherein the first antenna is configured for signal reception and the second antenna is configured for signal transmission and signal reception.

16. The satellite terminal of claim 14, wherein the instructions are executable by the processor to cause the satellite terminal to:
  determine the first attenuation profile based at least in part on a physical location of the satellite terminal; and
  determine the second attenuation profile based at least in part on a physical location of the satellite terminal.

17. The satellite terminal of claim 14, wherein the instructions are executable by the processor to cause the satellite terminal to:
  trigger the communication between the satellite terminal and the satellite not included in the set of one or more satellites based at least in part on the identified diagnostic condition.

18. The satellite terminal of claim 14, wherein the instructions are executable by the processor to cause the satellite terminal to:
  select, from a plurality of satellites providing a communication service, the satellite not included in the set of one or more satellites based at least in part on the identified diagnostic condition.

19. The satellite terminal of claim 14, wherein the instructions are executable by the processor to cause the satellite terminal to:
  communicate, to a device outside the satellite terminal, at least one of: the first attenuation profile, the second attenuation profile, a difference between the first attenuation profile and the second attenuation profile, or the identified diagnostic condition.

20. An apparatus for satellite communications comprising:
  means for identifying a first attenuation profile for a first position of a satellite terminal, the first attenuation profile mapping at least one radio frequency (RF) signal characteristic associated with a set of one or more satellites;
  means for identifying a second attenuation profile for a second position of the satellite terminal, the second attenuation profile mapping the at least one RF signal characteristic associated with the set of one or more satellites; and
  means for identifying, based at least in part on the first attenuation profile and the second attenuation profile, a diagnostic condition for communication between the satellite terminal and a satellite not included in the set of one or more satellites.

\* \* \* \* \*